United States Patent [19]
Perreault et al.

[11] Patent Number: 6,011,508
[45] Date of Patent: Jan. 4, 2000

[54] ACCURATE POSITION-SENSING AND COMMUNICATIONS FOR GUIDEWAY OPERATED VEHICLES

[75] Inventors: Brian M. Perreault, Stow; Tracy M. Clark, Bedford, both of Mass.

[73] Assignee: MagneMotion, Inc., Acton, Mass.

[21] Appl. No.: 08/961,632

[22] Filed: Oct. 31, 1997

[51] Int. Cl.[7] ............... G01S 1/70; B61L 1/00; G08G 1/123

[52] U.S. Cl. ............ 342/350; 340/988; 340/989; 246/167 R; 246/122 R

[58] Field of Search .................. 340/988, 989; 246/197 R, 122 R; 342/350

[56] References Cited

U.S. PATENT DOCUMENTS

| | | |
|---|---|---|
| 3,029,893 | 4/1962 | Mountjoy . |
| 3,440,600 | 4/1969 | Frech et al. . |
| 3,532,934 | 10/1970 | Ballman . |
| 3,609,676 | 9/1971 | Janquet et al. . |
| 3,628,462 | 12/1971 | Holt . |
| 3,636,508 | 1/1972 | Ogilvy et al. . |
| 3,679,874 | 7/1972 | Fickenscher . |
| 3,768,417 | 10/1973 | Thornton et al. . |
| 3,772,640 | 11/1973 | Auer, Jr. et al. . |
| 3,786,411 | 1/1974 | Kurauchi et al. . |

(List continued on next page.)

FOREIGN PATENT DOCUMENTS

| | | |
|---|---|---|
| 1418 128 | 12/1975 | European Pat. Off. . |
| 0 229 669 | 7/1987 | European Pat. Off. . |
| 0 482 424 B1 | 10/1996 | European Pat. Off. . |
| 235 786 A3 | 5/1986 | Germany . |
| 195 35 856 A1 | 3/1997 | Germany . |
| 129336 | 10/1994 | Japan . |
| 1140212 | 2/1985 | U.S.S.R. . |
| WO 95/21405 | 8/1995 | WIPO . |

OTHER PUBLICATIONS

Inductive Power Transfer to an Electric Vehicle–Analytical Model Author: Manochehr Eghtesadi.

The Roadway Powered Electric Vehicle—An All–Electric Hybrid System Authors: Edward H. Lechner and Steven E. Shladover.

Inductive Power Transfer to an Electric Vehicle Authors: Khosrow Lashkari, Steven E. Shladover and Edward H. Lechner.

U.S. Patent Application No. 92–11687 Title: Asynchronous Bidrectional Network Interface Enabling Seamless Concurrent Processing in a Distributed Heterogeneous Multiprocessor System.

*Primary Examiner*—Mark Hellner
*Attorney, Agent, or Firm*—David J. Powsner; Choate, Hall & Stewart

[57] ABSTRACT

The invention provides guideway-based methods, apparatus and systems for tracking, sensing and communicating with objects, such as track and roadway vehicles, as well as waystations therefore. Such a system comprises a winding, a transmitter and a receiver. The winding is made up of two or more phased conductors connected to form one or more closed current paths. The phased conductors are conductive elements (such as wires) shaped or configured in periodically repeating patterns, such as saw tooths, sinusoids or square waves. The transmitter applies to at least one of the phased conductors a position-sensing signal which has an envelope that varies as a periodic function of a first position along (or relative to) the winding. The sensor, which is disposed at a second position along the winding, detects the position-sensing signals on the winding and generates a signal indicating the distance between the first and second positions. That distance signal is a function and, specifically, a superposition, of the position-sensing signals carried by the multiple phased conductors at the second position. Related methods and apparatus permit communications between objects along the winding.

55 Claims, 26 Drawing Sheets

U.S. PATENT DOCUMENTS

| | | |
|---|---|---|
| 3,858,521 | 1/1975 | Atherton . |
| 3,906,436 | 9/1975 | Kurauchi et al. . |
| 3,927,735 | 12/1975 | Miericke et al. . |
| 4,023,753 | 5/1977 | Dobler . |
| 4,061,089 | 12/1977 | Sawyer . |
| 4,132,175 | 1/1979 | Miller et al. . |
| 4,361,202 | 11/1982 | Minovitch . |
| 4,441,604 | 4/1984 | Schlig et al. . |
| 4,522,128 | 6/1985 | Anderson . |
| 4,665,830 | 5/1987 | Anderson et al. . |
| 4,666,829 | 5/1987 | Anderson . |
| 4,671,185 | 6/1987 | Anderson et al. . |
| 4,726,299 | 2/1988 | Anderson . |
| 4,776,464 | 10/1988 | Miller et al. . |
| 4,794,865 | 1/1989 | Lindberg . |
| 4,914,539 | 4/1990 | Turner et al. . |
| 5,108,052 | 4/1992 | Malewicki et al. . |
| 5,251,563 | 10/1993 | Staehs et al. . |
| 5,267,514 | 12/1993 | Staehs et al. . |
| 5,277,124 | 1/1994 | DiFonso et al. . |
| 5,277,125 | 1/1994 | DiFonso et al. . |
| 5,293,308 | 3/1994 | Boys et al. . |
| 5,325,974 | 7/1994 | Staehs . |
| 5,409,095 | 4/1995 | Hoshi et al. . |
| 5,435,429 | 7/1995 | Van Den Goor . |
| 5,590,604 | 1/1997 | Lund . |
| 5,590,995 | 1/1997 | Berkers et al. . |
| 5,592,158 | 1/1997 | Riffaud ................................... 340/941 |
| 5,595,121 | 1/1997 | Elliott et al. . |
| 5,720,454 | 2/1998 | Bachetti et al. .................... 340/988 X |

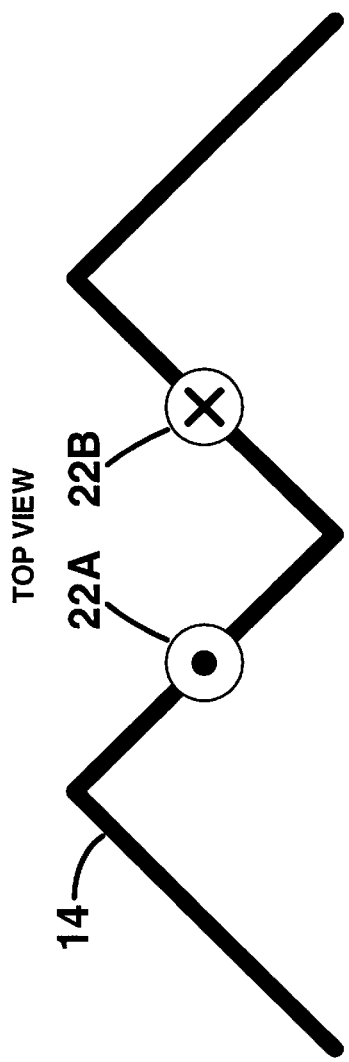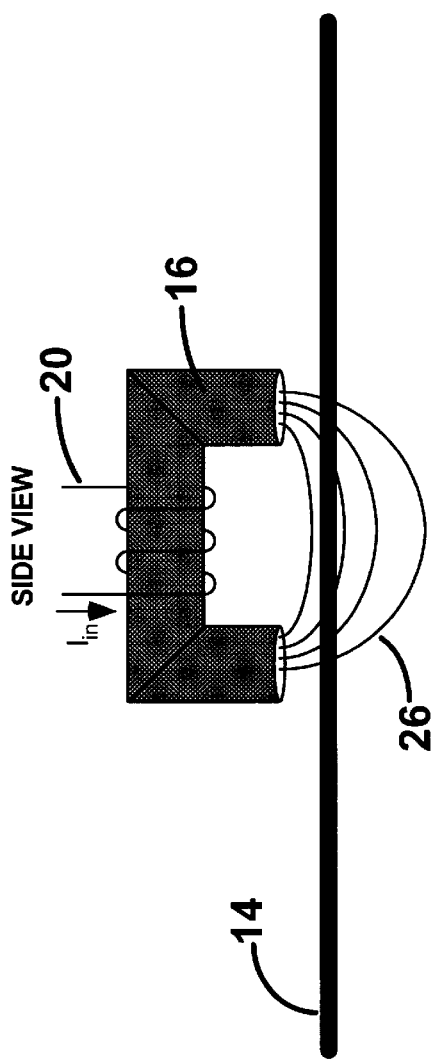

ACCURATE POSITION-SENSING AND COMMUNICATIONS FOR GUIDEWAY OPERATED VEHICLES

BACKGROUND OF THE INVENTION

This invention pertains to vehicular transport and, more particularly, to methods and apparatus for the sensing the position of, and communicating with, vehicles on a guideway. The invention has application, for example, in track- or guideway-operated vehicular systems, e.g., in on-board tracking of vehicle position and relative distance and in communicating between vehicles and between a vehicle and the wayside.

In the prior art, many different position-sensing systems have been proposed and placed into commercial use. The requirements for modern, automated transportation systems place stringent demands upon such systems for accurate, reliable information. In the case of Personal Rapid Transit (PRT), for instance, headways of one second or less have been proposed. With such short headways, it is imperative to have accurate, up to date position information to prevent vehicle collisions and operate in a safe manner.

A leaky waveguide implementation of a relative position-sensing mechanism has been proposed for use in transportation. This technique is very similar to RADAR within a waveguide, where a radio frequency signal is introduced in the waveguide and distance to the preceding vehicle is measured by the time delay of the echo. The waveguide is designed in such a manner that the radio frequency signals are constrained to travel, for the most part, within the waveguide. Since the waveguide is open on one side to allow these signals to be introduced, the signal strength decays with distance as some of the signal 'leaks' out of this opening. Such a system tends to be fairly expensive to implement, in terms of both the waveguide and the radio frequency transmitter and receiver.

In order to acquire the range necessary for transit systems, a fairly expensive waveguide is typically necessary in such a system. Range is fairly limited, and is affected by weather conditions, limiting the usefulness of such a technique since the system must be designed for worst case scenarios. Although distance is fairly accurately measured, this technique has been implemented only to measure the distance to the preceding vehicle.

Another system proposed by the prior art for relative position-sensing is the discrete circuit transmission line. The transmission line consists of three parallel conductor cables bridged by discrete resistors at regular intervals in a ladder-type network. In this technique, each vehicle injects a sinusoidal signal into the transmission line through an antenna. The signal decays exponentially in the transmission line according to distance from the source. A following vehicle can detect the signal and extract approximate distance from the signal magnitude.

This system suffers to a small degree from component drift, and to a larger degree from variations in gap distance and track irregularities. With a small change in gap between antenna and transmission line, there may be a large change in signal magnitude. Thus, if the gap is slightly larger than nominal, a following vehicle would detect a lower level signal and determine that it is farther away from the preceding vehicle than the actual distance. The accuracy of the system also degrades with increasing distances between vehicles, since the signal decays exponentially. One particular implementation of the transmission line was fairly expensive to build due to its discrete nature and the inclusion of ferrite slugs in the guideway at regular intervals to improve performance. Again, this system only allows distance to either preceding or following vehicles to be detected. A bi-directional system could be implemented, however, by utilizing two sets of transmitters at different frequencies.

A further prior art system capable of relative position-sensing is that of low cost vehicle RADAR. Such a system utilizes a low power radar transceiver to detect the position of other nearby vehicles or radar reflectors on those vehicles. In order to hold costs in check in some proposals, no high power RF amplifiers are used and thus only low power signals are utilized; range is very limited in this system. This system is also limited to line of sight measurements, and thus range is very limited on guideway curves. This system had been proposed for use in warning systems on automobiles as well as Group Rapid Transit (GRT) systems. Since this type of radar system is not yet in mass production, the cost is still fairly high.

Many systems also exist in the prior art to allow a vehicle to detect its own position on the guideway. One widely used conventional system used for this purpose is that of an odometer. Odometers suffer from the accumulation of error over fairly long distances. Odometers also depend upon wheel traction for an accurate measurement of position. In icy conditions or other conditions in which wheel traction is lost, odometers may not operate properly.

The prior art also includes the use of markers along a guideway for the detection of position on board a vehicle. Such markers are typically spaced at regular intervals along a guideway, and thus only update position periodically. Such markers may be of optical, magnetic, inductive, or ultrasonic varieties.

Another technique proposed in the prior art is the utilization of the Global Positioning System (GPS) to acquire position information on board a vehicle. A direct implementation is not adequately accurate for many transportation systems. Differential positioning using the GPS has been proposed to circumvent this limitation. Other limitations include inadequate signal strength in underground installations and multipath interference in urban areas.

Inductive loops and ladder transmission lines (e.g., of the types disclosed in U.S. Pat. Nos. 3,772,640, 3,906,436, and 3,979,091) have also been utilized in the prior art to determine, at a wayside location, the approximate position of a vehicle on a guideway. The resolution of such systems are in discrete steps, depending upon the transposition periods utilized in the transmission lines. Related techniques have been used to instruct a vehicle of its proper location on a guideway, by placing a signal in a transposed winding which is inverted every time a sensor is supposed to cross the transposition. Thus, during proper operation, the sensor does not see the inversions of the signal.

A variety of methods have been used in the prior art to enable communication between a vehicle and the wayside. Most of these methods involve the use of wireless radio communication, wherein the spectrum used is regulated by government agencies. One disadvantage of such schemes is signal degradation from intervening structures such as buildings and tunnel walls. Another problem with such schemes is far field interference from other radio frequency sources.

Some inductive communication schemes have been proposed (e.g., in U.S. Pat. Nos. 3,979,091 and 3,617,890) to alleviate these problems. These schemes use inductive loops with regular transpositions to transmit and receive signals, reducing the effects of far field sources and far field emissions.

In view of the foregoing, an object of the invention is to provide improved methods and apparatus for guideway-based position sensing and communication.

Another object of the invention is to provide such methods and apparatus as can be applied to sensing the positions of, and communicating with, vehicles operated on or in conjunction with a guideway.

Yet another object of the invention is to provide such methods and apparatus as can be applied to all types of vehicles, regardless of whether they travel over rail, road or other mediums.

A still further object of the invention is to provide such methods and apparatus as permit on-board detection of vehicle position, as well as wayside-based detection.

Yet still another object of the invention is to provide such methods and apparatus as permit vehicle detection and communication, e.g., regardless of whether the vehicle is underground or otherwise obscured from contact with a ground station antenna or satellite.

Still yet another aspect of the invention is to provide such methods and apparatus as provide highly accurate position sensing.

These and other objects of the invention are evident in the drawings and in the disclosure that follows.

SUMMARY OF THE INVENTION

The foregoing are among the objects attained by the invention, which utilizes a phased conductor winding to convey position-sensing and communications signals between a transmitter (e.g., at a wayside station or on a moving vehicle) and a sensor (e.g., on a moving vehicle).

More particularly, one aspect of the invention provides a guideway-based system for position sensing comprising a winding, a transmitter and a receiver. The winding is made up of two or more phased conductors connected to form one or more closed current paths (or "loops"). Thus, for example, two or three phased conductors can be connected at their ends to form a single or multiple loops, four phased conductors can be connected in pairs to form two loops, and so forth. The phased conductors are conductive elements (such as wires) shaped or configured in periodically repeating patterns, such as saw tooths, sinusoids or square waves. The "phases" of repeating patterns are offset with respect to one another, e.g., so that no two peak at the same time. An example of simple winding is a "flattened" twisted wire pair.

The transmitter applies to at least one of the phased conductors a position-sensing signal which has an envelope that varies as a periodic function of a first position along (or relative to) the winding. Thus, for example, the position-sensing signal can have an envelope that is a sinusoidal function (e.g., a trigonometric sine or cosine) of the position of the transmitter itself on the winding.

The sensor, which is disposed at a second position along the winding, detects the position-sensing signals on the winding and generates a signal indicating the distance between the first and second positions. That distance signal is a function and, specifically, a superposition, of the position-sensing signals carried by the multiple phased conductors at the second position.

According to further aspects of the invention, the transmitter and sensor are inductive elements, e.g., wire-wrapped ferrite cores with poles facing and adjacent to the winding. The poles of the sensor, for example, can be disposed in such a way that magnetic flux emanating from the phased conductors (as a result of transmission of the position-sensing signals) induces a voltage (or current) in the sensor dependent on the position of the sensor relative to each phased conductor. The poles of any given sensor are of opposing polarity and, hence, exhibit a high rejection to radiation sources in the far field.

Likewise, a transmitter can induce in the phased conductors position-sensing signals that vary in accord with distance relative to the phased conductors. As above, since the poles of the transmitter are of opposite polarity, they create negligible radiation in the far field.

Related aspects of the invention provide systems as described above in which the sensor generates a distance signal (e.g., for use in a vehicle or at a wayside on which the sensor is positioned) with an envelope that varies as a periodic function of the distance between the first and second positions relative to the winding. For example, according to one aspect of the invention, where the distance between the first and second positions is 36.5 radians (expressed relative to the period of the phased conductors), the envelope of the distance signal can have a value of 0.363185 (i.e., the cosine of 36.5). Where that distance increases to 37 radians, the envelope of the distance signal increases in value to 0.765414 (i.e., the cosine of 37).

To insure that such a periodic envelope of the distance signal does not remain at zero, e.g., if the transmitter and sensor are constantly $3\pi$ radians apart, further aspects of the invention utilize multiple sensors, e.g., on the same vehicle. According to these aspects, the sensors are disposed substantially near one another, yet, spaced apart along the winding. For example, two such sensors can be offset one-quarter period, with respect to the period of the repeating pattern of the phased conductors. Three or more such sensors can be equally spaced over an entire such period.

Still further aspects of the invention provide a system as described above in which the transmitter is stationary, yet, applies to the winding a position-sensing signal that has an envelope like that of a moving transmitter, i.e., a virtual marker. This can be accomplished, for example, by applying to the phased conductors currents (or potentials) identical to those that would be applied by a moving transmitter. Such virtual markers can be used to pace vehicles moving along the guideway.

Aspects of the invention described above have application in the guideway-based tracking of, and communications with, vehicles. According to one such aspect of the invention, position-sensing signals are induced in the winding by a wayside transmitter which, at the output of vehicle-based sensors, appear identical to those produced by a transmitter on board a stationary vehicle. A vehicle is able to track its own position and velocity relative to the position of the supposed stationary vehicle on the winding and, thus, its own position and velocity. This information can be utilized with a vehicle-based odometer to detect wheel slip and implement a traction control system.

In a related aspect of the invention, virtual marker signals are introduced into the winding from two or more wayside-based transmitters which appear, at the output of vehicle-based sensors, to be identical to those produced by a transmitter on board a moving vehicle. A vehicle may thus track its own position and velocity relative to this virtual vehicle, and thus its relative position and velocity to an arbitrary, moving point on the winding as specified by a wayside system.

Further aspects of the invention provide systems for the communication of information over a winding of the type described above. According to these aspects of the invention, a transmitter (e.g., disposed on a vehicle or at a wayside station) applies to the winding a communication signal containing information to be transmitted. As with the position-sensing signals described earlier, the transmitted information signal has an envelope with a periodic amplitude dependent on the position of the transmitter relative to the winding. A sensor (e.g., disposed on a moving vehicle) generates a received information signal as a superposition of the transmitted information signals in two or more phased conductors at a second position along the winding.

In related synchronous communications aspect of the invention, the system includes a receiver that compensates for position-related variations in the received information signal, e.g., by applying a gain to the output of the sensor that is dependent upon its relative distance from the transmitter, thereby, compensating for sinusoidal variation in the amplitude of its envelope. More particularly, for example, a communication system as described above can include multiple sensors (e.g., disposed on a moving vehicle) that are offset from one another. The receiver in such a system can decode the transmitted information by synchronously "rectifying" the outputs of the sensors and negatives thereof, i.e., by selecting the sensor output (or negative thereof) whose envelope has the greatest positive amplitude.

In an asynchronous communications aspect of the invention, the system utilizes a plurality of offset sensors, the outputs of which are combined to reduce or eliminate position-dependent variation in the received information signal. Thus, for example, the transmitted information signal can comprise multiple "symbols," e.g., sub-signals distinguishable from one another by frequency or shape. Such symbols can represent, for example, the binary values "0" and "1", e.g., with respective waveforms of differing frequency (e.g., 3000 Hz and 4000 Hz, respectively) and/or differing shape (e.g., sine wave and square wave, respectively).

The plural sensors, which are offset from one another, e.g., by multiples of one-quarter of the period of the winding, detect the multi-symbol transmitted information signal, e.g., via induction. An amplifier determines the level of each symbol in the resulting "channel" signals, e.g., by convolving each sensor output with the symbols. The respective levels of each symbol in each channel (or sensor output) can then be squared and summed with one another. In this way the content of the transmitted information can be decoded in a manner independent of the relative distance of the transmitter and sensors.

Yet still further aspects of the invention provides a communication system as described above in which the transmitter applies to the winding, in addition to the communication signal, a position-sensing signal of the type described above. Multiple sensors, e.g., on a moving vehicle, sense the communication signal and the position-sensing signal, both as superpositions of signals contained on the conductors at a second position. A receiver compensates for position-related variation in the communication signal by applying gain based on the distance between the first and second positions (and, therefore, based on the expected variation of the communication signal) and/or by rectifying the sensor outputs in the manner described above.

The aforementioned aspects of the invention can be implemented, for example, over a single-phase, two-conductor winding. This is accomplished by use of a periodic winding wherein the conductors form identical repeating patterns, that are spatially offset from one another. The two conductors are connected at the end points of the winding to form a closed current path, or loop. In the position-sensing aspect of this invention, operation over a single-phase winding can be accomplished through the use of two or more transmitters driven with harmonically related carrier frequencies and with two or more sensors. In the communication aspects of this invention, identical bit streams can be transmitted in separate frequency bands. Signal paths defined from one transmitter to one sensor are combined to decode the transmitted information.

In a further aspect of the invention, the position-sensing and communication features of the system are implemented on the same winding as is used for propulsion in a linear motor.

The foregoing and other aspects of the invention are evident in the drawings and in the description that follows.

BRIEF DESCRIPTION OF THE DRAWINGS

A more complete understanding of the invention may be attained by reference to the attached drawings, in which:

FIGS. 2 and 3 depict how changes in transmitter (or sensor) position effect the magnetic flux applied to (or received from) a phased conductor in a system according to the invention;

DETAILED DESCRIPTION OF THE ILLUSTRATED EMBODIMENT

System Structure

Several useful position-sensing, control, and communications mechanisms may be implemented utilizing an architecture with a multi-phase winding and appropriate sensors and transmitters according to the invention. Position-sensing mechanisms include detection of position on a winding and detection of position relative to a transmitter on the winding. Control mechanisms include the implementation of moving virtual markers which vehicles may detect. Communication may also be achieved over the winding.

The winding is central to the architecture and provides the signal paths used to implement the desired functions. This winding would typically be laid in the middle of a guideway (e.g., track or roadway) underneath a vehicle, although other topologies can work equally well. The winding may be independent of or part of a winding in a linear motor whose primary purpose is propulsion. Transmitters on the wayside and on the vehicle are utilized to induce signals in the winding. Sensors are used to detect these signals introduced into the winding.

Although the invention contemplates the use of windings of any length, typical windings are constructed in segments that are sized in accord with the expected size, number and spacing or headway of objects, e.g., vehicles, tracked. As a rule of thumb, it is expected that a conventional segment will be between 4 and 100 times as long as the average vehicle handled thereby. Shorter lengths may be used, for example, in high traffic areas or where pathway constraints dictate. Though the term "winding" is generally used herein to refer to such segments, those skilled in the art will appreciate that the invention is not so limited.

Winding, Transmitters, and Sensors

A wide variety of winding topologies, such as sinusoids, square waves and sawtooths, may be utilized to convey position-sensing and communication signals along the guideway. The basic structural requirement is a periodic pattern of the phases within the winding. The techniques described may be implemented on such a winding with two or more regularly spaced phases connected in long loops. Extensions will be described to use the same techniques on a single-phase winding. It should be noted that it is necessary to tailor the shape of the vehicle transmitters and sensors to that of the winding in order to obtain an optimum system.

Figure 1:
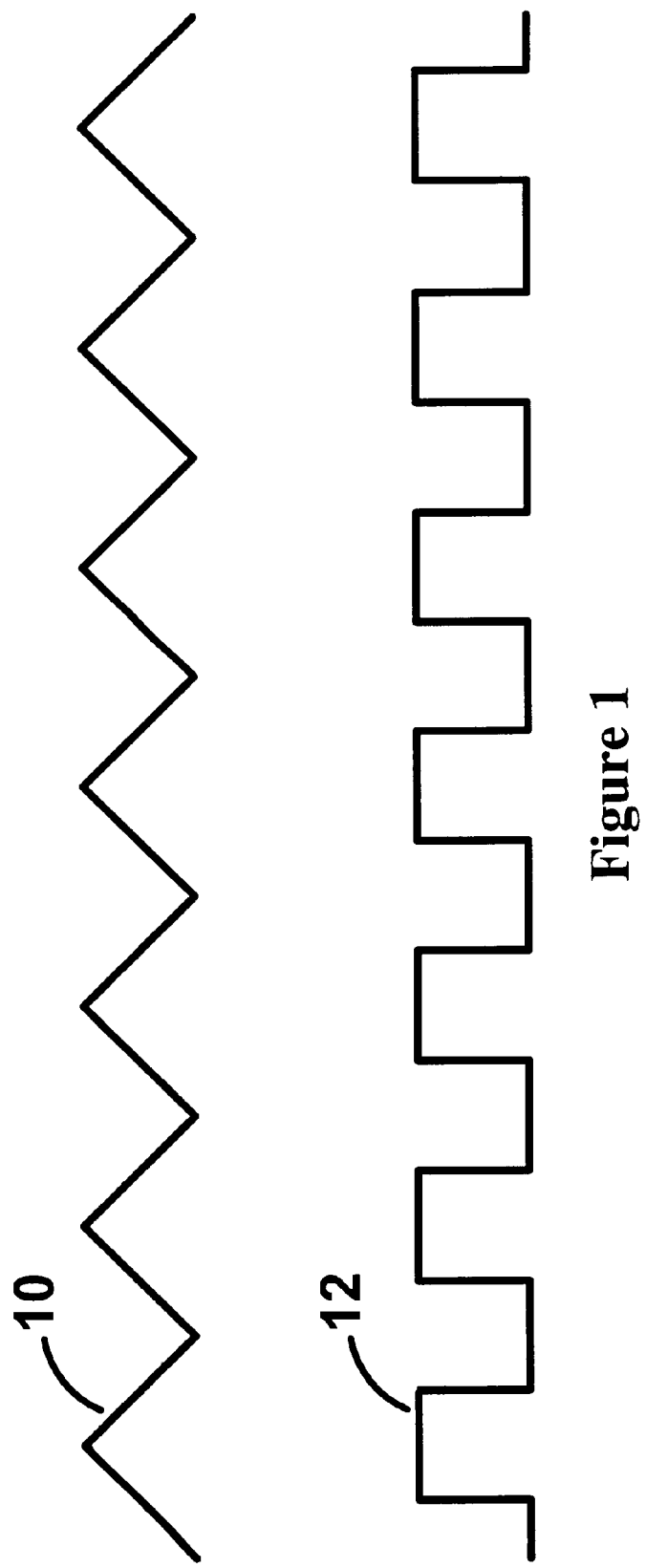
FIG. 1 depicts repeating patterns of the type used in a phased conductor according to the invention.

FIG. 1 illustrates two possible choices, sawtooth 10 and square wave 12, for a winding pattern used in a guideway (not shown). Each of the possible choices is illustrated with seven periods of a single conductor. This conductor may be solid, or may be constructed out of "litz" wire, which is composed of several insulated strands, to improve conduction at high frequencies.

In addition to traditional metallic conductors, the winding may be fabricated from superconducting ceramics and other compounds capable of carrying position-sensing and communications signals as discussed herein. The gauge of individual conductors used in the windings may vary down to the microscopic and, particularly, depends on frequency of operation and length of the windings.

Figure 2A:
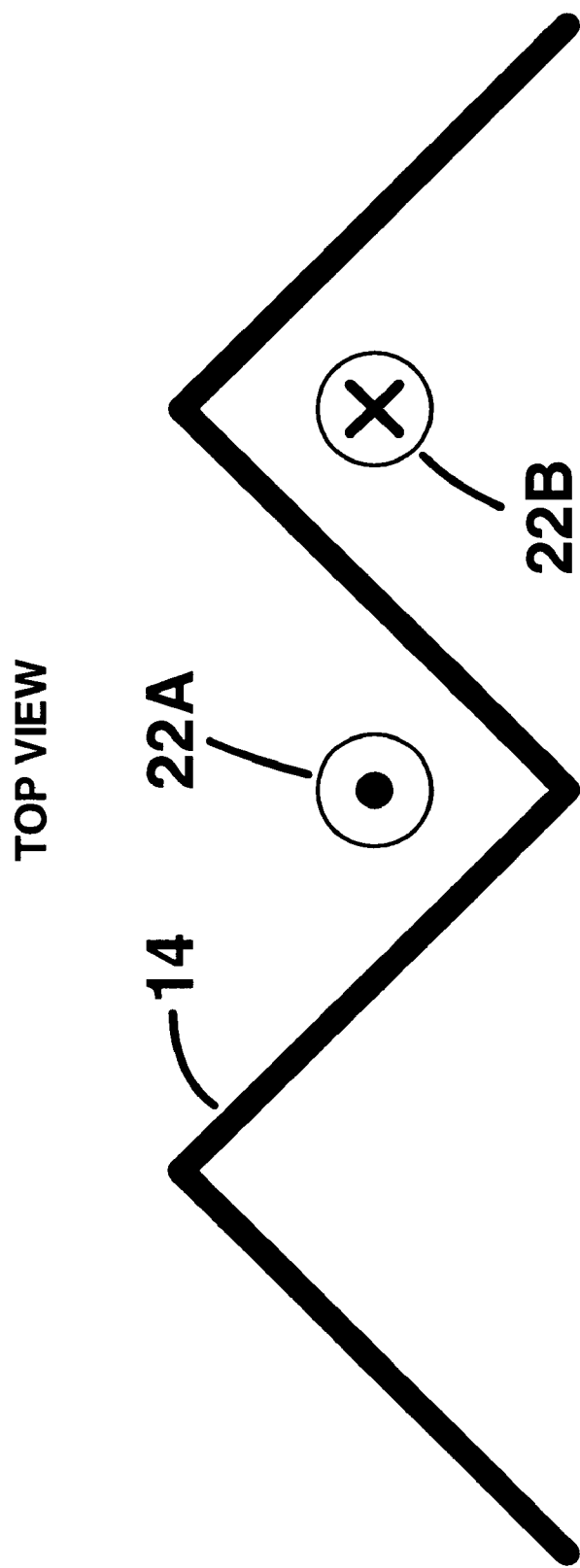
Figure 2B:
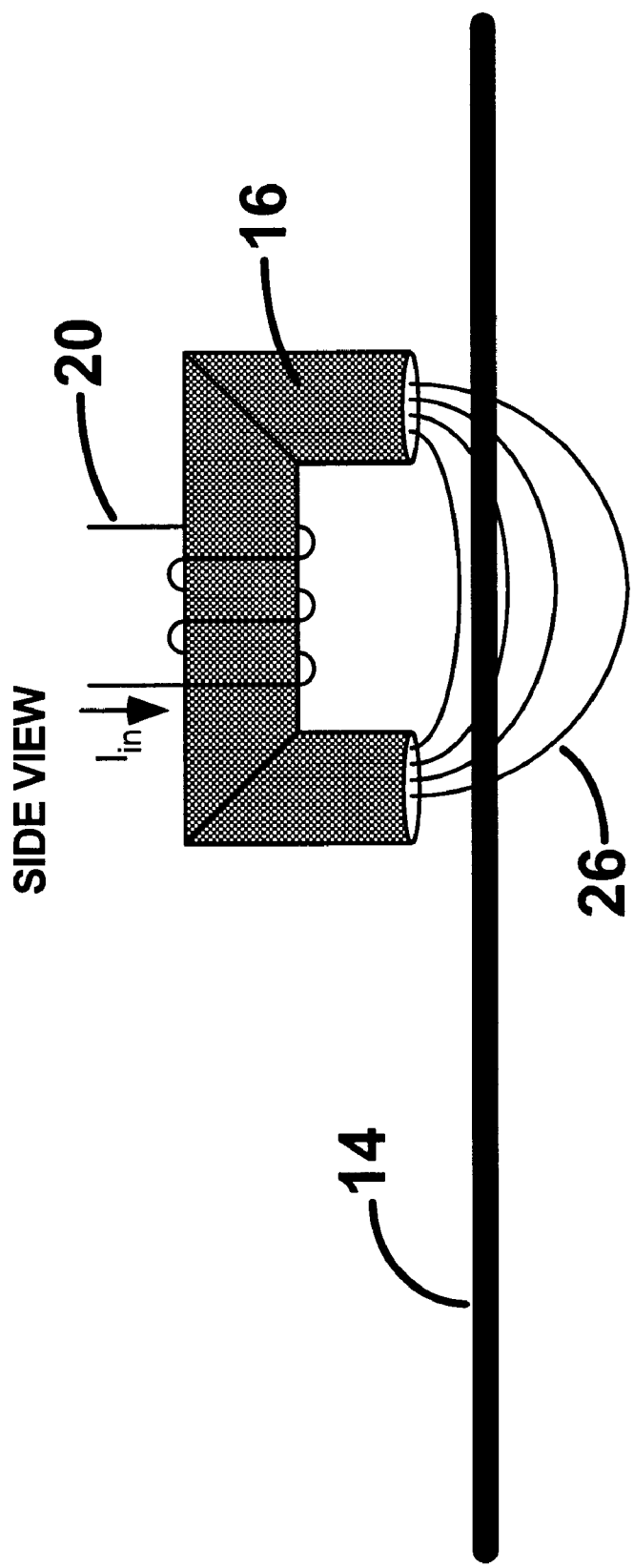

FIGS. 2A and 2B, respectively, show the interaction of such a conductor 14 with a transmitter 16. The transmitter is composed of a ferrite 'C' core, or other material with a high magnetic permeability and a winding 20 around the core. An AC signal current is driven through the core winding creating a magnetic field between the two pole faces 22A, 22B as is illustrated by magnetic field lines 26 in the figure. Such a transmitter may also be constructed from a "figure-8" winding or other similar structure.

The amount of magnetic flux which encircles the conductor depends upon the position of the transmitter relative to the conductor. FIGS. 2A–2B illustrate the case where the amount of flux encircling the conductor is at a maximum, since most of the flux in the core wraps around a diagonal member of the conductor. FIGS. 3A–3B illustrate the case where the net flux encircling the conductor is at a minimum. This may be shown with an integration of the magnetic field in a plane terminating along the conductor. Since the pattern of the conductor repeats in the horizontal direction, the amount of flux encircling the conductor will be a periodic function of the position of the transmitter, $\theta$. A single period is represented here as a distance of $2\pi$. A mutual coupling function, $F(\theta)$, exists between the transmitter and conductor, and depends on the shape of the pole faces of the transmitter, topology of the winding, and the distance between the transmitter and the winding. By shaping the transmitter correctly, the fundamental component of the Fourier Series dominates this periodic function. Thus, $F(\theta) \approx \cos(\theta)$.

If a sinusoidal current $I_{in}=I_0 \sin(\omega_c t)$ is driven through the transmitter winding, a flux $\phi_L = \phi_0 \sin(\omega_c t)$ is created through the plane of the conductor. This time-varying flux induces a voltage in the conductor which is proportional to the derivative of the total flux around the conductor. Due to the shape of the winding, the total flux around the conductor will be of the form $\phi_L = \phi_0 F(\theta) \sin(\omega_c t)$. Thus, the induced voltage will have two terms; one term is due to the sinusoidal variation of the current in the transmitter and the second is due to transmitter movement relative to the winding. By using a carrier frequency $\omega_c$ which is much higher than the fundamental frequency of coupling level variation $F(\theta)$ at maximum vehicle speed, the latter term becomes negligible. Of course, those skilled in the art will appreciate that a low frequency, or DC, carrier signal can be used, although, this may preclude position sensing where there is little or no relative movement.

Position-Sensing Using a Single Loop

Figure 4:
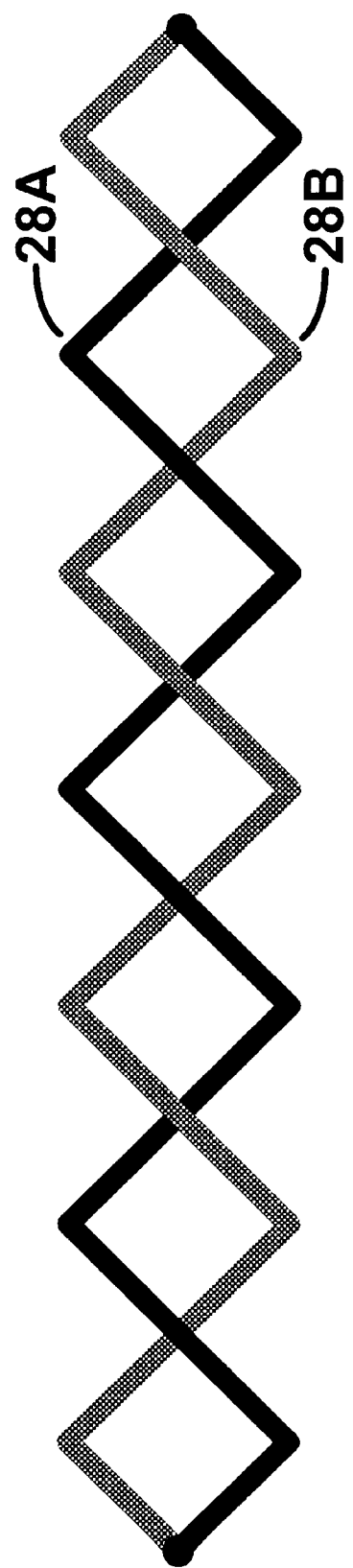
FIGS. 4, 5 and 8 illustrate windings used in a guideway according to the invention.

Thus, a voltage of approximately $V_w = V_0 F(\theta) \cos(\omega_c t)$ is induced in the conductor, where $F(\theta)$ takes into account the position-varying coupling with the conductor. In order to create a current signal in the conductor which may be detected by inductive means, a closed loop path is necessary. One method to close the loop is to utilize a second conductor with the same winding pattern as the first, offset spatially and connected to the initial conductor at either end. FIG. 4 illustrates such a configuration, comprising conductors 28A, 28B, with an offset of a half of a period. This configuration forms a set of transposing loops, which the signal from the transmitter couples with. The voltage induced around the loop, or phase, formed by the two conductors is $V_w = V_0(F(\theta) - F(\theta - \pi))\cos(\omega_c t)$, where $\pi$ represents a half of one period; this voltage creates a current signal in the loop formed by the two conductors of the phase. With the approximation given above, $F(\theta) \approx \cos(\theta)$, the voltage around the loop simplifies to:

$$V_w = V_0(\cos(\theta) - \cos(\theta - \pi))\cos(\omega_c t) = 2V_0\cos(\theta)\cos(\omega_c t).$$

The amplitude of the signal coupled into the phase is proportional to the cosine of the position of the transmitter. At transmitter positions of $\theta = \pi/2 + \pi N$, where N is an integer, no signal is induced in the loop.

Position-Sensing Using Two Loops

Figure 5:
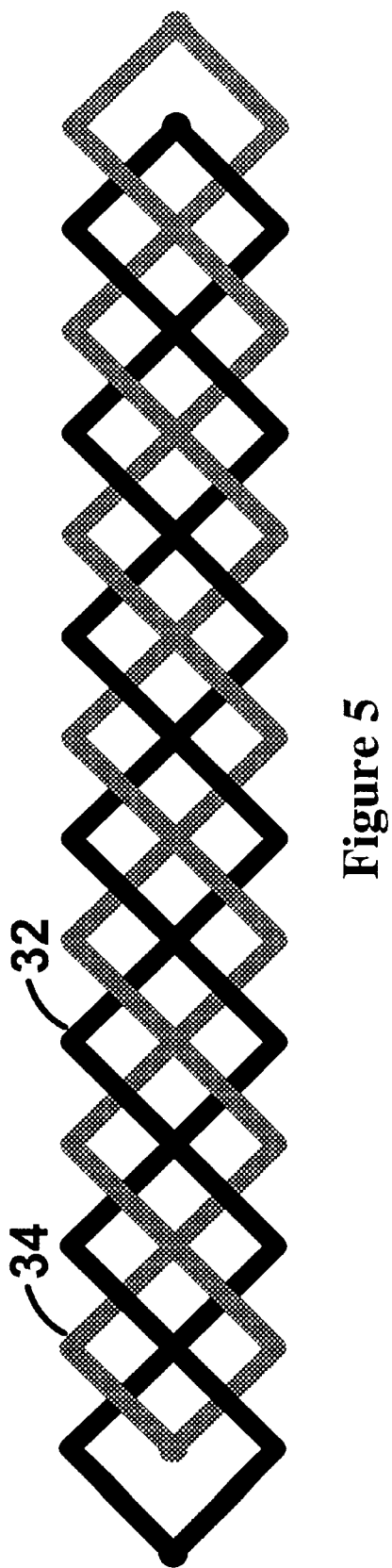

For this reason, it is desirable to add one or more additional phases, each composed of two conductors. If three or more phases are utilized, they should be spatially offset from each other such that the phases are equally spaced over a single period. In the preferred embodiment, two phases 32, 34 are used, separated by a quarter period, as illustrated in FIG. 5. In this case, the voltages induced in each of the two phases are as follows:

$$V_{phase\_a} = V_0 \cdot \cos(\theta) \cdot \cos(\omega_c t)$$

$$V_{phase\_b} = V_0 \cdot \cos(\theta - \pi/2) \cdot \cos(\omega_c t)$$

With equal impedances in each phase, the current signals will be:

$$I_{phase\_a} = I_0 \cdot \cos(\theta) \cdot \cos(\omega_c t + \beta)$$

$$I_{phase\_b} = I_0 \cdot \cos(\theta - \pi/2) \cdot \cos(\omega_c t + \beta)$$

The $\beta$ term in these expressions reflects the phase shift in the current signal which will be created if the impedance of the phase contains an inductive component.

Sensing the Position-Sensing Signal from Two Loops

Sensors may be placed on a vehicle to detect these signals in the winding. Such a sensor may be identical in form to the vehicle transmitter. Thus, the coupling function between the sensor and a phase in the winding is identical to that of the transmitter. However, a voltage is sensed on the winding of the sensor instead of driving the transmitter winding with a signal source. It may also be desirable to use more winding turns on the sensor than on the transmitter to improve the sensitivity. The signal detected by the sensor is a combination of the signals in each of the phases weighted by the position-dependent coupling level of the sensor with each of the phases.

Figure 6:
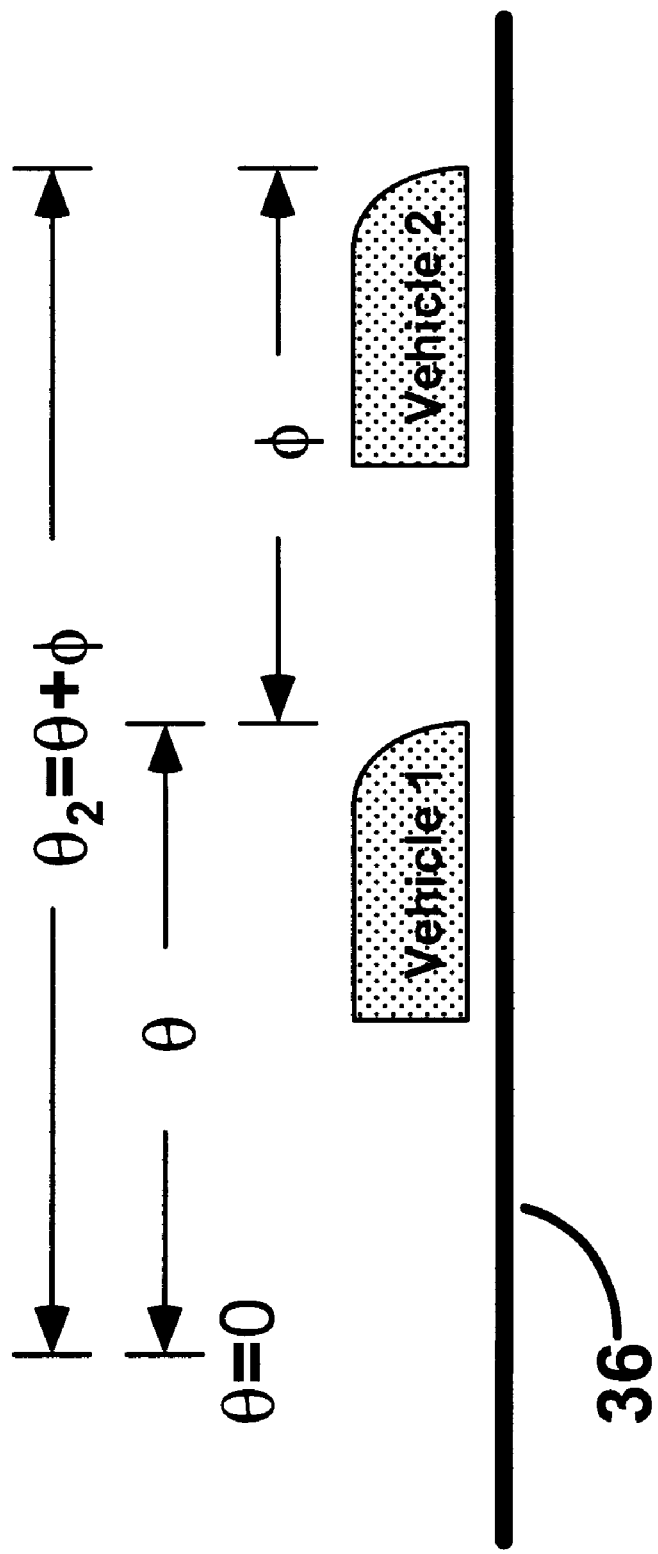
FIG. 6 illustrates a relationship between vehicles having transmitters and sensors in a system according to the invention.

FIG. 6 illustrates a scenario where a transmitter is on board Vehicle 1 at position $\theta$ relative to winding 36 and a sensor is on board Vehicle 2 at position $\theta_2 = \theta + \phi$ relative to the winding 36. The vehicles are separated in this illustration by a distance $\phi$. In the case of the two-phase winding, the signal detected at the output of the vehicle sensor may be calculated from the signals induced in each phase by the transmitter. The total voltage is the sum of the signals in each phase multiplied by the coupling of each of those phases to the sensor. Again, the voltage induced at the sensor is the time derivative of the total amount of flux linked by the sensor. This voltage will again have two terms, only one of which is significant. Thus, $$V_{vehicle\_sensor} = V_2 \sin(\omega_c t + \beta) \cdot \begin{bmatrix} \cos(\theta)\cos(\theta + \phi) + \\ \cos(\theta - \pi/2)\cos(\theta + \phi - \pi/2) \end{bmatrix}$$

$$= V_2 \sin(\omega_c t + \beta) \cdot [\cos(\theta)\cos(\theta + \phi) + \sin(\theta)\sin(\theta + \phi)]$$

$$= V_2 \sin(\omega_c t + \beta) \cdot \cos(\theta + \phi - \theta)$$

$$= V_2 \sin(\omega_c t + \beta) \cdot \cos(\phi)$$

Thus, the analysis illustrates that the inductive coupling between the sensor and the transmitter is proportional to the cosine of the difference in position. This result will be used to enable position-sensing and communication functions. A similar result may be derived for a winding with three or more equally spaced phases—only the magnitude of the signals will change.

The signal received by the sensor is a product of two terms—one term, $V_2\cos(\phi(t))$, represents the mutual coupling between the transmitter and sensor and the other term, $\sin(\omega_c t + \beta)$, is the carrier. One may thus view the received signal as the coupling level modulated up to the carrier frequency. The position information is contained in the coupling level, and thus it is desirable to demodulate the coupling level down from the carrier frequency to obtain the mutual coupling information. Alternatively, the signal may be viewed as the carrier signal modulated by the coupling level between the transmitter and sensor. If a communication signal is embedded in the carrier, then it is desirable to remove the modulating effect of the coupling level on the received signal to recover the communication signal.

Wayside Transducers

Figure 7:
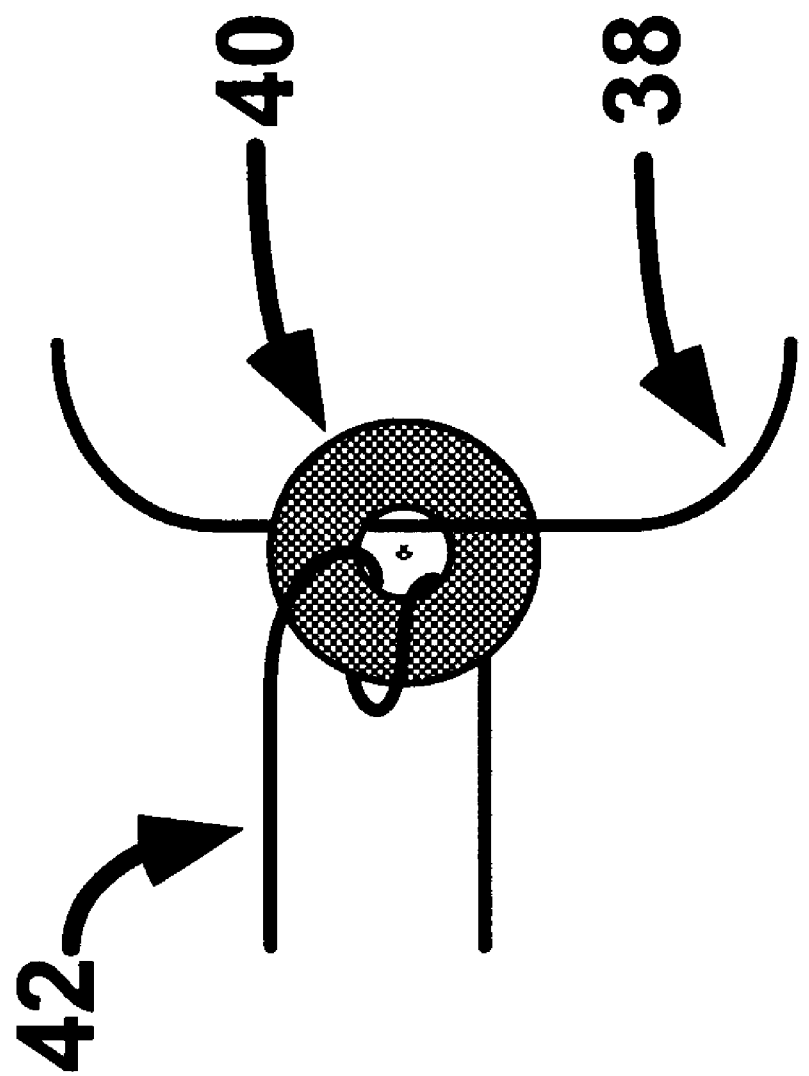
FIG. 7 illustrates a sensor used to sense signals at a wayside station in a system according to the invention.

Sensors may be utilized at the wayside to detect the signals in each phase of the winding. Referring to FIG. 7, for example, by running a conductor 38 from a phase through a toroidal, ferromagnetic core 40, the signals may be sensed on a secondary winding 42 on the core. The voltage sensed on the secondary winding of such a sensor on Phase a from a vehicle transmitter would be of the following form:

$$V_{sensor\_a} = V_1 \cdot \cos(\theta) \cdot \sin(\omega_c t + \beta)$$

Similarly, transmitters may be used to place signals into the phases of the winding at the wayside. The transmitter may be identical in form to the wayside sensor, and a current is driven through the transmitter winding to couple a signal into the winding phase.

Position Sensing Using a Three-Phase Winding

A useful alternate winding structure exists which uses only single-conductor phases. An additional conductor is used to return the currents generated in each of the phases. In this structure, at least two phases are necessary for proper operation. In order to operate properly, the return conductor should have a low impedance as compared with each of the phases, and should couple very little of the flux generated by the transducer.

Figure 8:
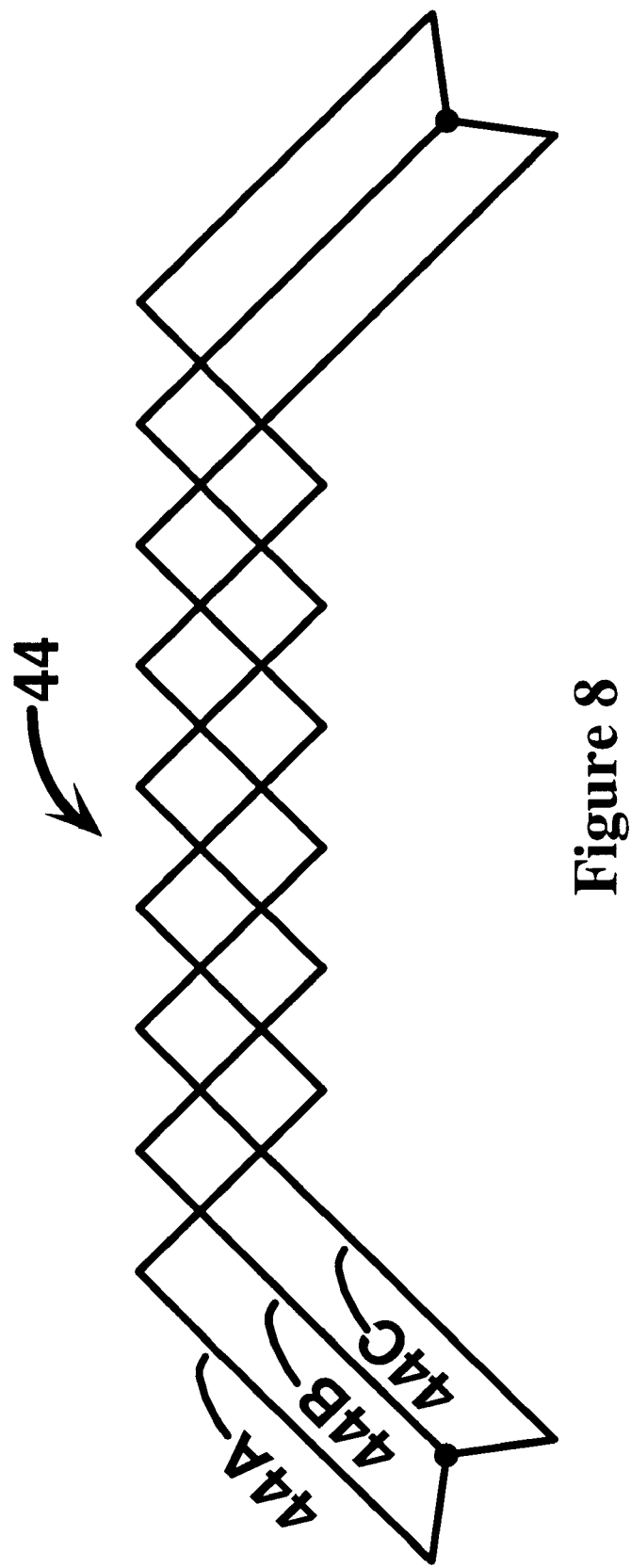

A more useful alternate winding structure exists which also uses only single conductor phases. In this structure, at least three phases are necessary for proper operation. In the three-phase case, the signal currents in each of the three phases return along the conductors of the other two. This is possible since the voltages induced in each of the three conductors form a three-phase set. When the ends of the three phases are connected in a wye configuration, the currents from the three phase set add to zero, and no return conductors are necessary, as shown below. An illustration of a short section of such a winding is shown in FIG. 8.

A signal driven by a wayside transmitter in the A phase (labeled 44A) conductor returns equally through the other two phases since the B and C phases (labeled 44B, 44C, respectively) have approximately equal impedances. The same is true of the signals in the B and C phases. Since the phases form a three-phase set and the returning currents flow in the opposite direction in the alternate two conductors, the current flowing in Phase A is of the proper form. This current, by superposition, is the sum of the currents generated by the voltages in each of the phases. The current induced by a vehicle-based transmitter is thus of the form:

$$I_{phase\_A} = I_1 \cos(\omega_c t + \beta) \cdot \left[\cos(\theta) - \frac{1}{2}\cos(\theta - 2\pi/3) - \frac{1}{2}\cos(\theta + 2\pi/3)\right]$$

$$= I_1 \cos(\omega_c t + \beta) \cdot \left[\frac{3}{2}\cos(\theta)\right]$$

With these signals, it is then straightforward to calculate the voltage induced at the sensor on Vehicle 2 from the signals induced in each of the three phases. The total voltage is the sum of the signals in each phases multiplied by the coupling of each of those phases to the sensor.

$$V_{vehicle2} = V_3 \sin(\omega_c t) \cdot \begin{bmatrix} \cos(\theta)\cos(\theta + \phi) + \\ \cos(\theta - 2\pi/3)\cos(\theta + \phi - 2\pi/3) + \\ \cos(\theta + 2\pi/3)\cos(\theta + \phi + 2\pi/3) \end{bmatrix}$$

It is possible to simplify this expression using the following trigonometric identities:

$$\cos(\theta + \phi) = \cos(\theta)\cos(\phi) - \sin(\theta)\sin(\phi)$$

$$\cos^2(\theta) = \frac{1}{2} + \frac{1}{2}\cos(2\theta)$$

$$\sin(\theta)\cos(\theta) = \frac{1}{2}\sin(2\theta)$$

$$\sin(\theta) + \sin(\theta - 2\pi/3) + \sin(\theta + 2\pi/3) = 0$$

$$\cos(\theta) + \cos(\theta - 2\pi/3) + \cos(\theta + 2\pi/3) = 0$$

and algebraic manipulation:

$$= V_3 \sin(\omega_c t + \beta) \cdot \begin{bmatrix} \cos^2(\theta)\cos(\phi) - \cos(\theta)\sin(\theta)\sin(\phi) + \\ \cos^2(\theta - 2\pi/3)\cos(\phi) - \cos(\theta - 2\pi/3)\sin(\theta - 2\pi/3)\sin(\phi) + \\ \cos^2(\theta + 2\pi/3)\cos(\phi) - \cos(\theta + 2\pi/3)\sin(\theta + 2\pi/3)\sin(\phi) \end{bmatrix}$$

$$= V_3 \sin(\omega_c t + \beta) \cdot \begin{bmatrix} \cos(\phi)[\cos^2(\theta) + \cos^2(\theta - 2\pi/3) + \cos^2(\theta + 2\pi/3)] - \\ \sin(\phi)\begin{bmatrix} \cos(\theta)\sin(\theta) + \cos(\theta - 2\pi/3)\sin(\theta - 2\pi/3) + \\ \cos(\theta + 2\pi/3)\sin(\theta + 2\pi/3) \end{bmatrix} \end{bmatrix}$$

$$= V_3 \sin(\omega_c t + \beta) \cdot \begin{bmatrix} \frac{1}{2}\cos(\phi)[3 + \cos(2\theta) + \cos(2\theta - 4\pi/3) + \cos(2\theta + 4\pi/3)] - \\ \frac{1}{2}\sin(\phi)[\sin(2\theta)] + \sin(2\theta - 4\pi/3) + \sin(2\theta + 4\pi/3) \end{bmatrix}$$

$$= V_3 \sin(\omega_c t + \beta) \cdot \left[\frac{3}{2}\cos(\phi)\right]$$

Note that this result is similar to the result for the two-phase, four-conductor winding, with only a change in magnitude. Thus, a winding with only 3 conductors may be used to practice the invention and is, perhaps, the best approach since it uses the fewest number of conductors. Such a structure will operate satisfactorily with three or more equally spaced, single-conductor phases.

Linear Motor Windings

A three phase winding of the type described above may be used simultaneously as the propulsion winding of a linear motor. While such a winding may be used directly for propulsion as well as position-sensing, it is desirable to be able to easily separate the position-sensing signals from the propulsion currents for processing. While separating the position-sensing and propulsion signals in frequency facilitates this task, it is desirable to separate the two using the structure of the winding as well. An example of how to achieve this goal will be shown for the three-phase case, but is equally applicable to two or more phases.

Figure 9:
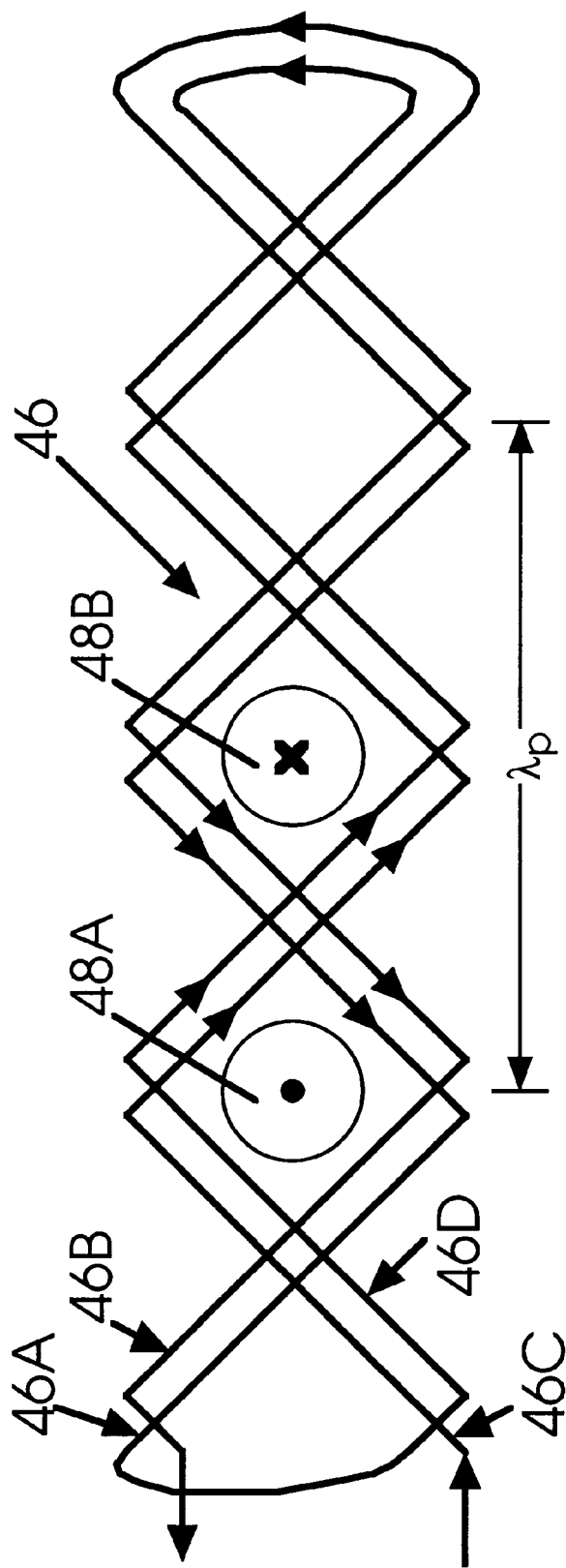
FIG. 9 illustrates the propulsion winding of a linear motor that can be used in conjunction with the position-sensing and communication signals in a system according to the invention.

For the application of a three-phase motor, four conductors 46A–46D may be utilized for each phase of the motor, as shown in FIG. 9. Only one of the three motor phases 46 is shown in FIG. 9 for clarity; the other phases are identical in structure and distributed uniformly over the winding period. A total of 12 conductors is used for the propulsion winding, with end termination as shown in FIG. 9. The motor phases may be connected to the power electronics drive module in either a delta or a wye configuration. A single pair of magnetic poles 48A, 48B representing the vehicle field array are aligned with the longitudinal axis of the winding, as shown in FIG. 9, although the actual field array would typically be comprised of many poles arranged with alternating polarity. The spatial period $\lambda_p$ of the field array is equal to the spatial period of the winding.

Figure 10:
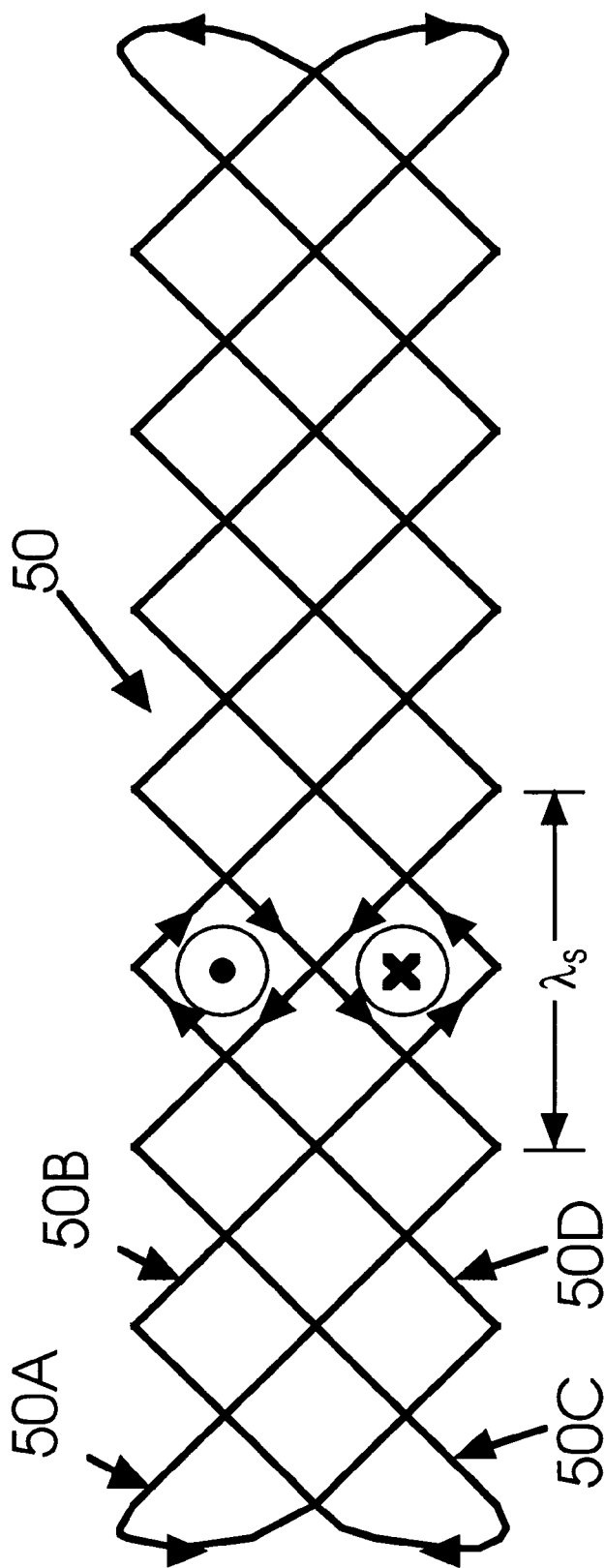
FIG. 10 illustrates the position sensing and communication winding that can be used in conjunction with a linear motor in a system according to the invention.

FIG. 10 shows one phase 50 of a 3-phase position-sensing winding configuration, although the same technique is applicable to two or more phases. Once again, four conductors 50A–50D are used for each phase. Thus a total of 12 conductors are used for the position-sensing winding, with end termination as shown in FIG. 10. A pair of poles representing the vehicle transducer are aligned transverse to the longitudinal axis of the winding and, preferably, perpendicular to that axis, as shown in FIG. 10. The spatial period $\lambda_s$ of the vehicle transducer is one half of the spatial period of the position-sensing winding, or equivalently, one half of the spatial period of the propulsion field array.

Figure 11:
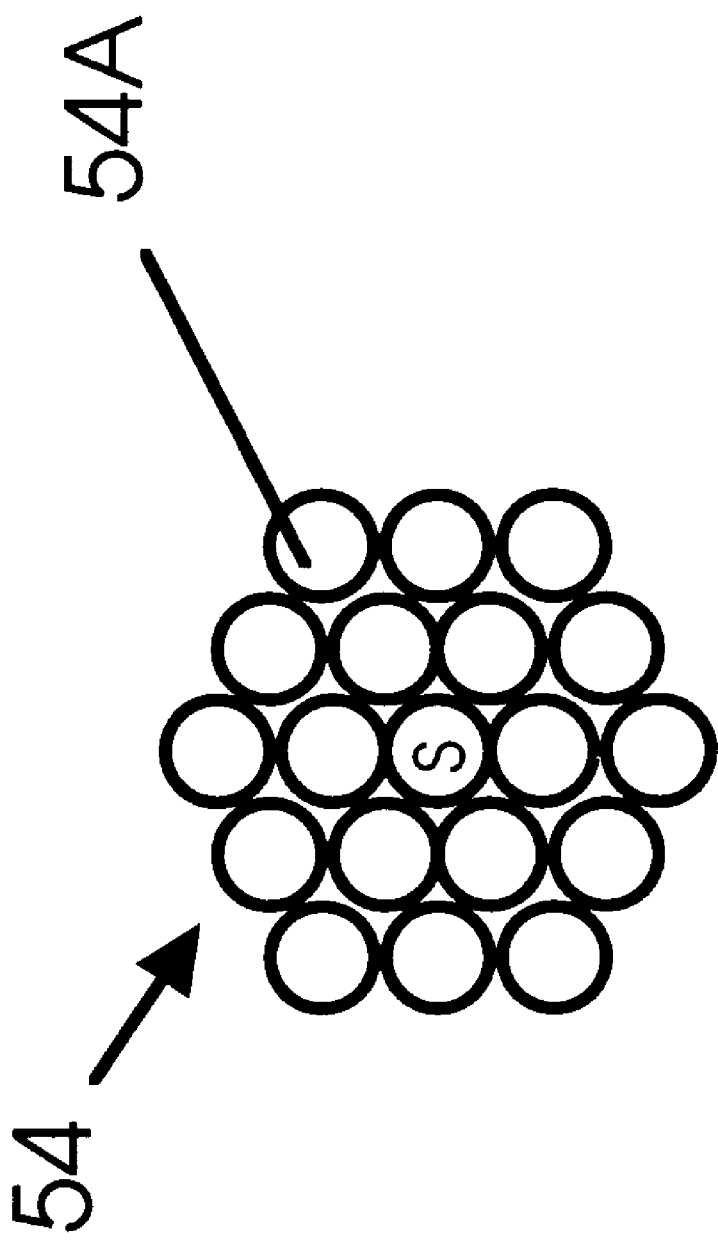
FIG. 11 illustrates the cross-sectional view of a conductor used in a winding to support both propulsion and position-sensing/communication functions in a system according to the invention.

When all three phases are considered, the conductors used in both the propulsion and the position-sensing winding have exactly the same shape; only the configuration of the end connections differentiates the two winding patterns. It is therefore possible to superimpose the two windings, thus combining the propulsion and position-sensing windings as one physical structure. One method of superimposing the two windings is to use a multi-strand Litz wire for each conductor. The cross-section of such a Litz wire 54 is shown in FIG. 11. Each of the strands, e.g., 54A, of the Litz wire is individually insulated. One strand of the Litz wire, marked 'S' in FIG. 11, is used to implement the position-sensing winding conductor. The remaining strands of the Litz wire are used to implement the propulsion winding conductor.

It is evident from FIGS. 9 and 10 that the transversely aligned position-sensing transducer has no net mutual coupling with the propulsion winding, and the longitudinally aligned vehicle propulsion field array has no net mutual coupling with the position-sensing winding. Utilizing different spatial period values for the propulsion and position-sensing windings reduces the inductive coupling between the two windings and facilitates separation of the position-sensing and propulsion signals. It will be appreciated by persons skilled in the art that similar results may be achieved using a variety of spatial period configurations, e.g. using a position-sensing period that is twice as long as the propulsion array period.

Staggered Guideways

In order to permit position determinations (and communications) on windings that are comprised of multiple segments, position-tracking information and communications signals may be transferred from segment to segment. In a preferred embodiment, this is accomplished by use of waystations disposed at the ends of each segment. Those waystations include transmitters that generate marker signals and other positional information for vehicles on the respective segments. They also include sensors for detecting communications from the vehicles (and other waystations) on the segment and for transmitting them to adjacent segments.

Figure 24:
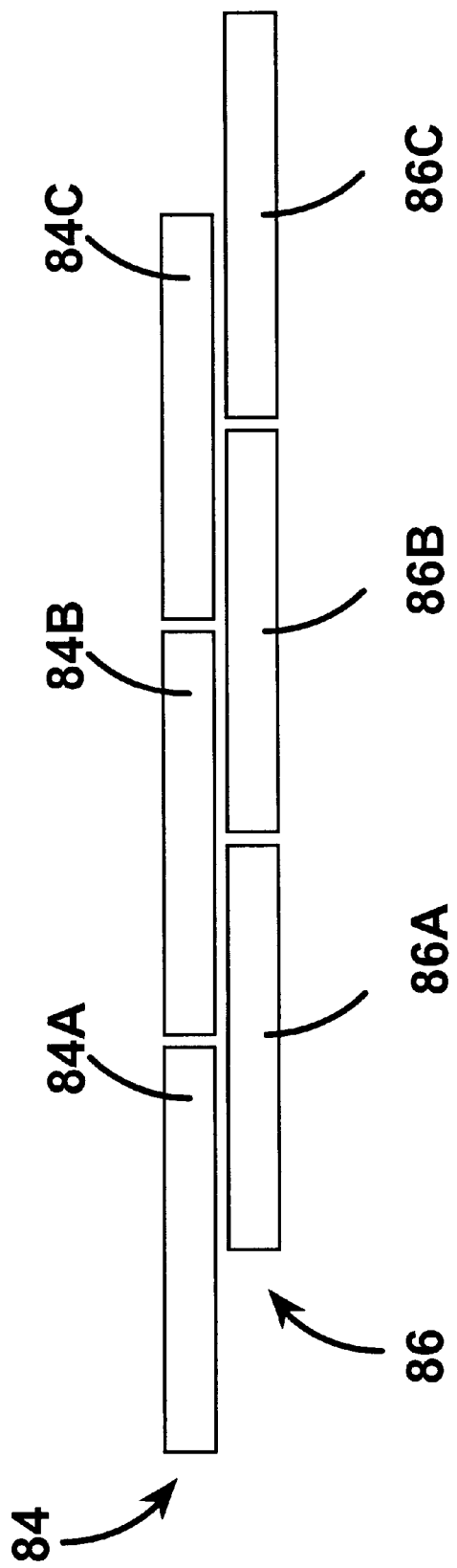
FIGS. 24–25 illustrate the use of staggered guideways (and windings) in a system according to the invention.
Figure 25:
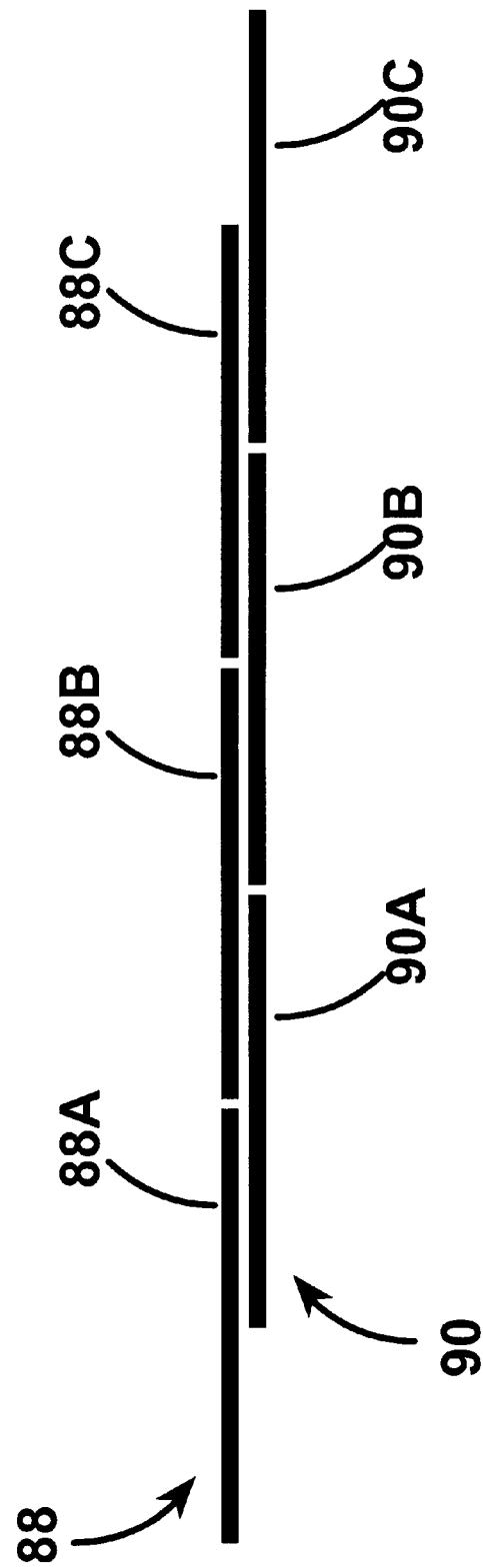

FIGS. 24 and 25 depict an overlapping arrangement of segments that provide a safeguard against possible loss of position-sensing or communication signals between neighboring vehicles that reside on different segments. These drawings illustrate two techniques to enable detection of all nearby vehicles. These techniques not only allow tracking of nearby vehicles on board a vehicle, but also give information about the absolute position of vehicles as they cross segment boundaries.

One approach is to utilize two sets of duplicate windings 84, 86 (comprising winding segments 84A–84C and 86A–86C, respectively), spaced side by side on a guideway, as shown from a top view in FIG. 24. Each vehicle has duplicate sensors for each of the two winding sets 84, 86. With such a setup, each vehicle may determine when other vehicles enter or leave the two windings that it is situated over. Thus, relative positions may be updated at these occurrences. Thus, any other vehicle within a half a segment length of a vehicle may be absolutely tracked.

In order to minimize hardware duplication, another approach utilizes two sets of overlapping windings 88, 90 (comprising winding segments 88A–88C and 90A–90C, respectively), as illustrated from a side view in FIG. 25. In this approach, three basic signal levels exist. For two vehicles in the same two segments, the signal is a full strength. For two vehicles with one winding segment in common, the signal is at half strength. When two vehicles do not have any segments in common, no signal is received. By detecting when existing signals change levels, knowledge of the position of a vehicle, crossing a specific boundary, is updated. Again, any vehicle within half of a segment length may be tracked continuously. This system has all of the benefits of the first system, but requires only half of the hardware.

Position-Sensing Circuitry and Methods

With the described winding, sensors, and transmitters, it is possible to implement several types of position-sensing features. The first position-sensing algorithm enables the tracking, on board a vehicle, of the relative position of other vehicles. This technique requires both a transmitter and sensor set on board the vehicle. A related technique enables autonomous position-sensing by a vehicle of its own precise position through the use of a single transmitter on the wayside and a set of sensors on board the vehicle. Finally, a technique is shown whereby a vehicle is able, through its on board sensor set, to track a moving virtual point on the guideway, as specified by a wayside system through wayside transmitters.

Relative Position-Sensing

Signals received on board a vehicle may be utilized to track the distance between one vehicle and the next. Operation of several vehicles on a single winding may be accomplished by transmitting at a different frequency on each vehicle. Filtering enables separation of the signals from any particular vehicle.

As stated in the previous section, the signal received on board a vehicle sensor from the transmitter on another vehicle is of the following form:

$$V_{Sensor\_1}=V_3\sin(\omega_c t+\beta)\cdot cos(\phi)$$

Figure 12:
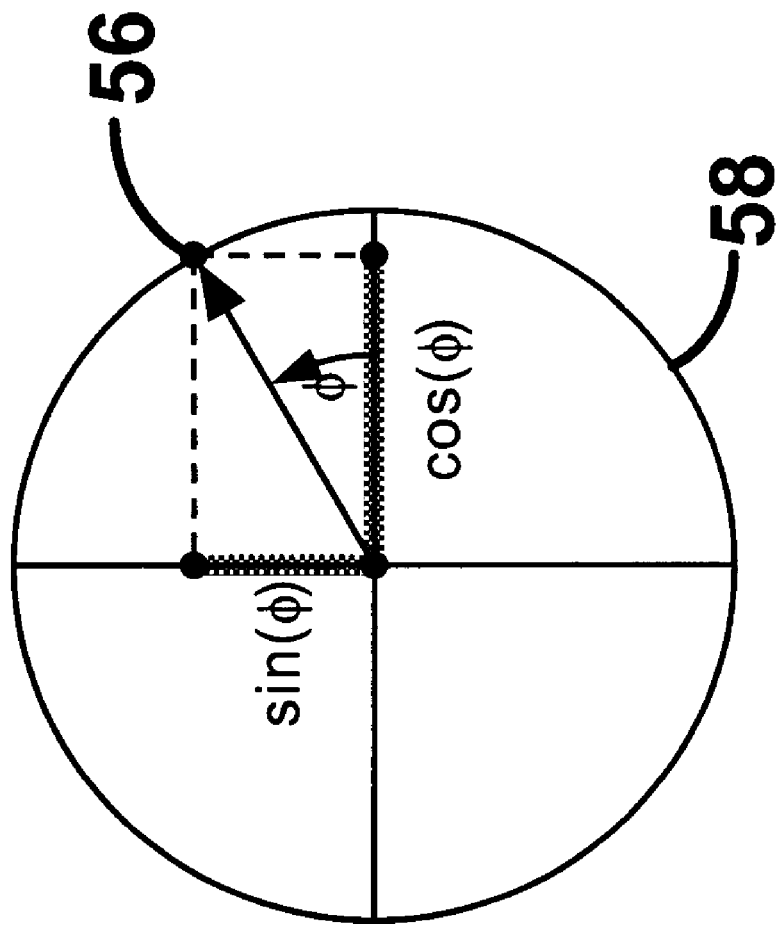
FIG. 12 illustrates a relationship between vehicle position and sensor output in a system according to the invention.

This result holds very closely with experimental measurements. It is important to note that this signal is not sufficient by itself to uniquely keep track of relative position, as illustrated in FIG. 12. If the electrical position is represented here by a point 56 on the circle 58, the coupling level may be interpreted as a measurement of the x coordinate of that point. Without additional information, the point on the circle may not be uniquely tracked as it moves. Consider the case where the transmitter and sensor are an integral number of cycles apart. The sensor and transmitter in this configuration are in the most highly coupled state. If the distance between the two decreases, the coupling, and thus the signal level, drops. If the distance between the two increases, the coupling also drops. It is not possible without additional information to know whether the vehicles are moving closer together or farther apart. It is extremely important to distinguish between these two cases. Therefore, it is very important to have the additional information necessary to keep track of the difference in position.

If the case is considered where the sensor and transmitter are an integral number of cycles apart plus or minus a quarter cycle, no signal is received at the sensor. Thus, it is not possible to track the carrier when in this configuration. Without knowledge of the carrier phase, the resulting sign of the coupling is lost when a suitable signal level is later reestablished. Thus, there must also be some means of tracking the carrier when the sensor and transmitter are in this configuration.

Figure 13:
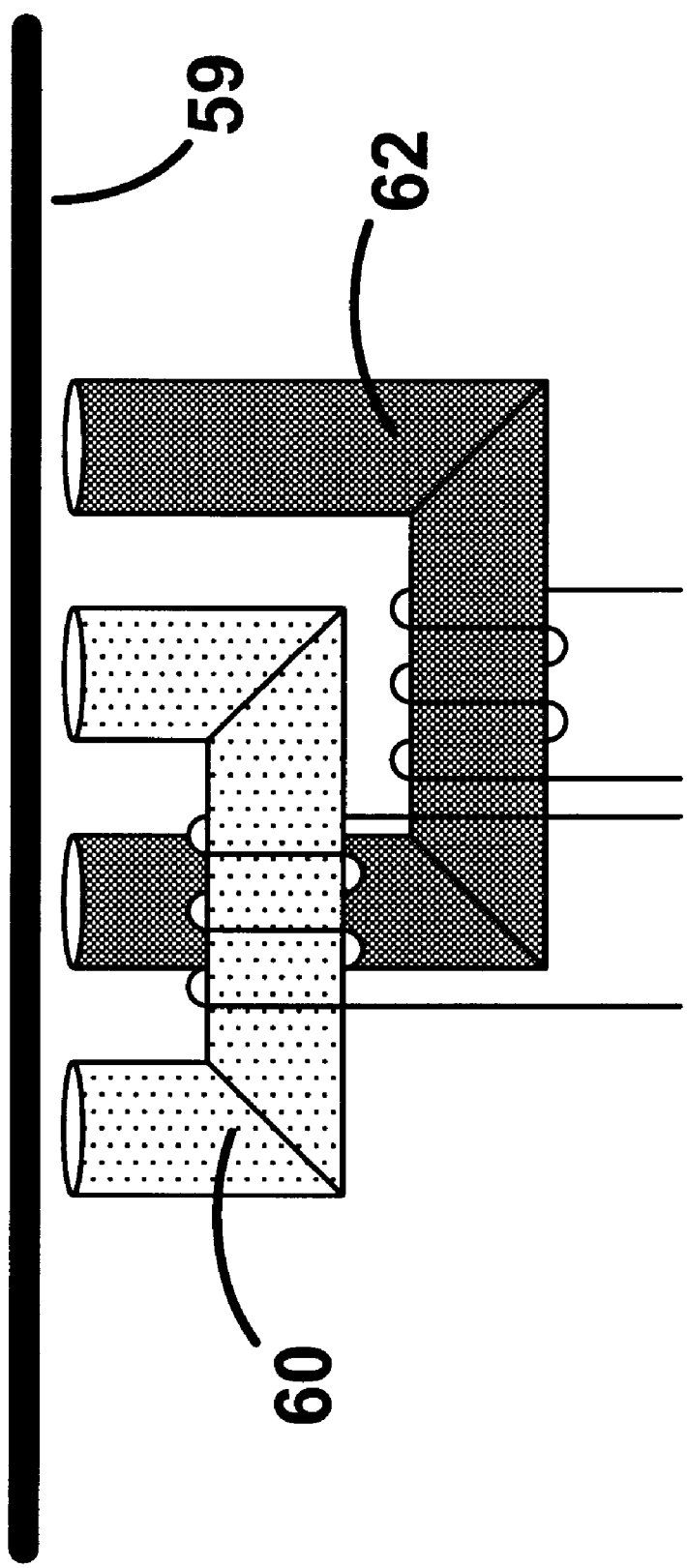
FIG. 13 illustrates a configuration of two sensors, e.g., on a vehicle, according to a practice of the invention.

One means to accomplish this task may be deduced from FIG. 12. A measurement of the sine of the position would give the additional information necessary to uniquely track a point on the circle as it moves. The solution is to add a second sensor similar to the first, except shifted by a quarter of a cycle in position with respect to winding 59 (which may be constructed in the manner of the windings shown in the prior figures and discussed above), as illustrated by FIG. 13. As shown, the two sensors 60, 62 would have to overlap in space, and is for illustration purposes. A practical implementation could shift one of the sensors by a period such that the sensors do not interfere with each other. Alternately, three or more sensors could be utilized, spaced equally over a period. The placement of a sensor may be varied by an integer number of periods due to spacing constraints. Such placements may be necessary, since the sensors may otherwise physically overlap or interfere with each other due to close proximity. Thus, $$V_{sensor2} = V_3 \sin(\omega_c t + \beta) \cdot \left[\frac{3}{2}\sin(\phi)\right]$$

Figure 14:
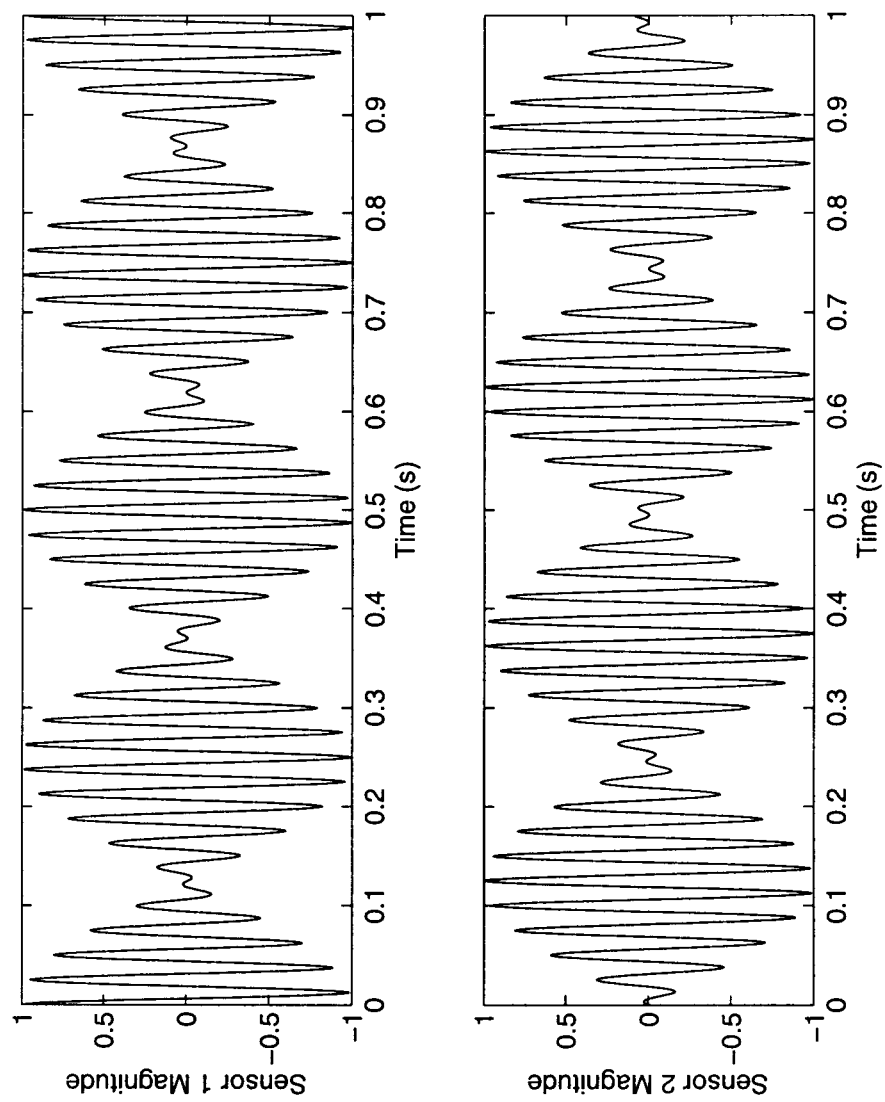
FIG. 14 illustrates position-sensing signals received by a vehicle as it moves away from a transmitter in a system according to the invention.

With the addition of this signal, it is possible to keep track of the difference in position. In fact, the two signals together determine the difference in phase uniquely. One coupling represents the x-coordinate while the other represents the y-coordinate in FIG. 12. If the phase of the carrier is unknown, however, the position is only known to ±180 degrees, but may still be tracked uniquely and corrected for. This uncertainty is due to the fact that the sign of the carrier is unknown, and thus the sign of the envelope of the signals is also unknown. A simulation of the signals received at these sensors is shown in FIG. 14 for the case where one vehicle moving away from the other at a constant speed. For illustration purposes, a higher frequency carrier has been replaced with a 40 Hz carrier.

Thus, with an arbitrary starting value, both signal envelopes will have either the correct sign, or both envelopes will have their sign inverted, resulting is an uncertainty of 180 degrees. Furthermore, if an initial estimate of position is obtained, the phase of the carrier may be determined and accounted for in the necessary calculations.

Position Sensing Using Two Sensors

Figure 15:
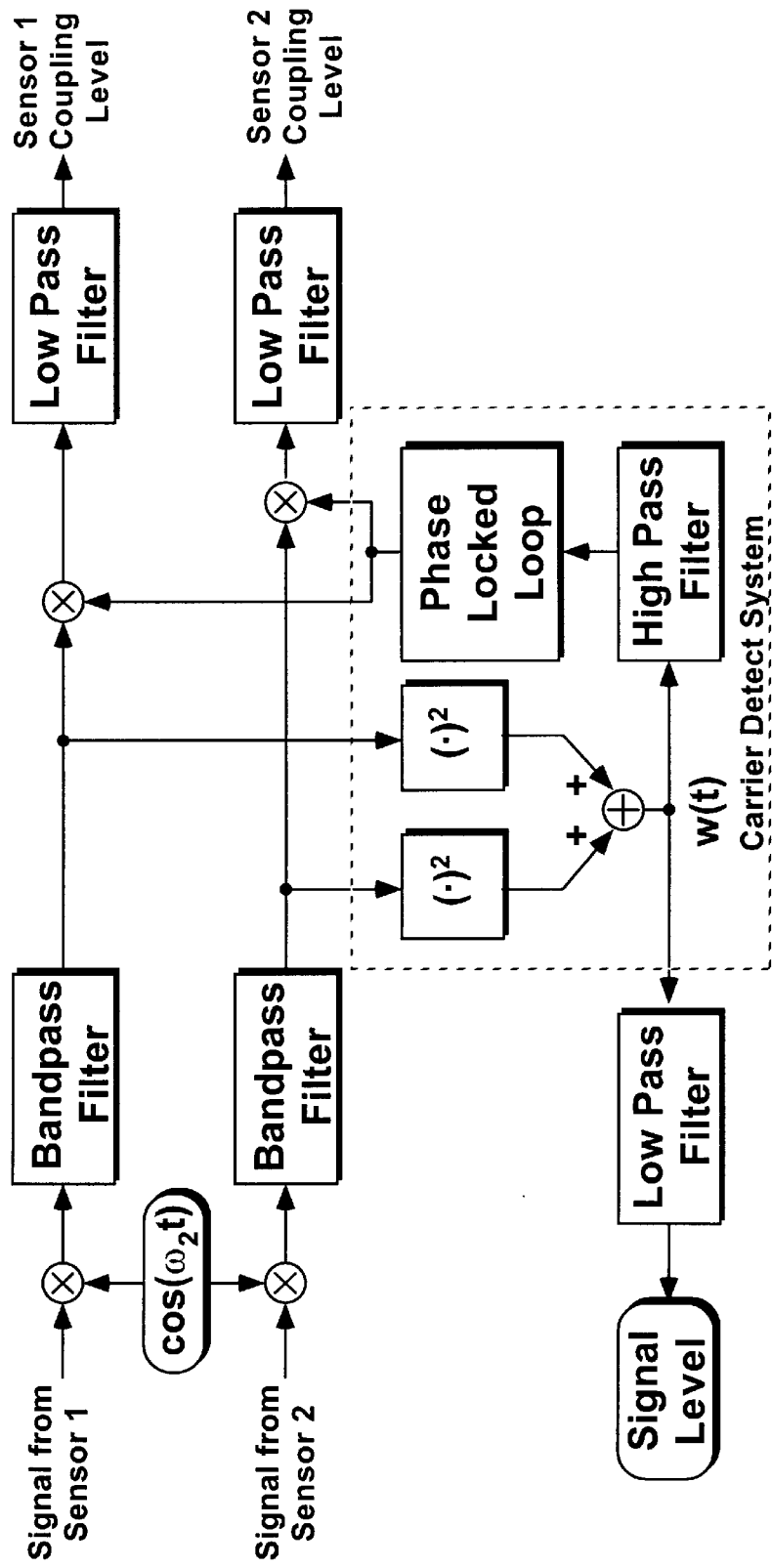
FIG. 15 illustrates circuitry for demodulating positional information from position-sensing signals in a system according to the invention.

With sufficient information available to uniquely track position, the actual algorithms may be described. Since the necessary information in the signal is in the coupling levels between the two sensors and a transmitter, the first step is to extract these parameters from the sensor signals. The sensor signals may be viewed as such coupling levels modulated by the transmitted carrier. If it is possible to track the carrier frequency, it becomes possible to demodulate the signals. One system utilized to demodulate the coupling levels from the sensor signals is shown in FIG. 15.

Since all the processing in this system may be performed in discrete-time, the first step in a discrete-time process of demodulation is to sample the signals with an analog to digital converter and necessary anti-aliasing measures. The carrier signal may be tracked with a phase locked loop (PLL) and some simple processing. Steps may be taken to reduce the demand on the sampling system and also on the computational load in a digital implementation. Since the sensor signals are narrowband in nature, the signals may be filtered and then modulated down to a lower frequency to reduce the computational load. The implementation of this idea is illustrated as the first operation after conversion in FIG. 15. Bandpass filtering is then used to separate the signals from one vehicle from other signals and noise received by the sensor In order for the phase locked loop to operate properly, it should constantly be fed the carrier signal it is to track. One manner in which to feed the PLL a constant amplitude carrier signal will be illustrated. This step is necessary since the two sensor signals carry either a positive or negative version of the carrier depending on the relative sign of the coupling. Also, the original sensor signals contain only a suppressed carrier signal.

It is thus necessary to recover the carrier signal from the sensor signals in order to track the carrier and demodulate the coupling signals. A constant amplitude, double frequency carrier signal may be obtained by squaring and adding the two bandpassed sensor signals, and high pass filtering. A signal level detector may be created by low pass filtering, and utilized for automatic gain control. The derivation in the time domain is as follows:

$$w(t) = \left(V_3 \sin(\omega_c t + \beta) \cdot \left[\frac{3}{2}\cos(\phi)\right]\right)^2 +$$
$$\left(V_3 \sin(\omega_c t + \beta) \cdot \left[\frac{3}{2}\sin(\phi)\right]\right)^2$$
$$= V_3^2 \sin^2(\omega_c t + \beta) \cdot \frac{9}{4}[\cos^2(\phi) + \sin^2(\phi)]$$
$$= A(1 - \cos(2\omega_c t + 2\beta))$$

This double frequency signal is fed into a PLL, which tracks this signal and outputs a signal at half the frequency. The carrier signal, with a sign uncertainty, has thus been reconstructed, and is utilized to modulate the bandpass signals back to the baseband as illustrated in FIG. 15. A filter is utilized to remove the double frequency artifact from the demodulated signal. The coupling signals are now available for use to track the relative position between vehicles, and are of the following form:

$$S_1 = A_1 \cos(\phi)$$

$$S_2 = A_1 \sin(\phi)$$

Methods for Position Determination

Described below are methods for determining position from the two sensor measurements. Those skilled in the art will, of course, appreciate that other techniques may be employed as well. The two signal magnitudes uniquely identify the relative phase between vehicles, as well as the signal amplitude. One simplistic method to combine the two signals is to divide Sensor 2 magnitude by Sensor 1 magnitude, resulting in the tangent of the phase. A simple inverse lookup table may be utilized to determine immediate relative phase.

Figure 16:
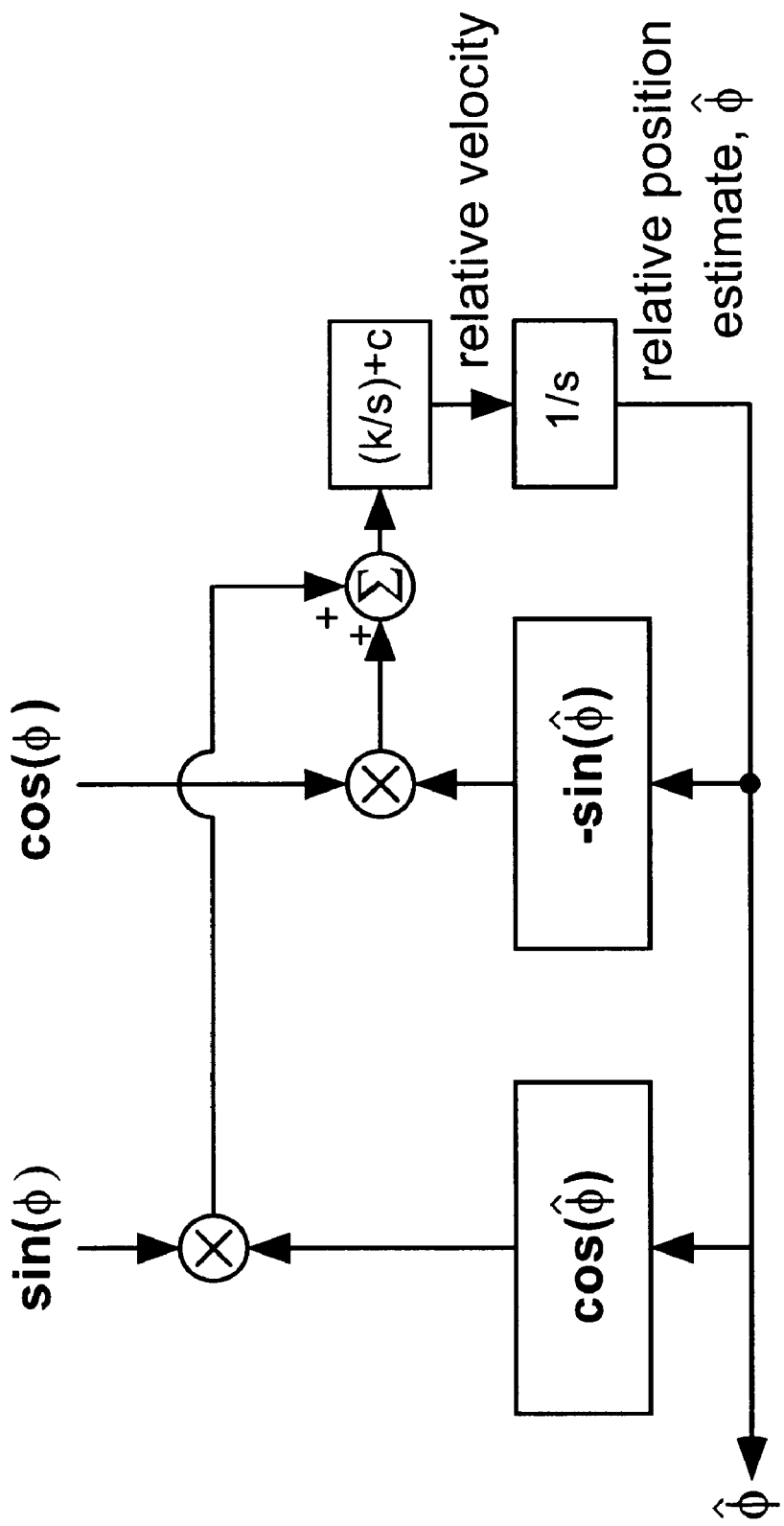
FIG. 16 illustrates circuitry for tracking vehicle position in a system according to the invention.

A better choice with several advantages is the use of an observer to track position. An observer may track the position and velocity while helping to reject noise and spurious inputs. One reliable method for tracking is to implement a non-linear observer, as illustrated in FIG. 16. The observer is non-linear because the innovation at the input of the observer is proportional to $\sin(\phi - \hat{\phi})$ rather than $(\phi - \hat{\phi})$. One may view this observer as a two input phase-locked loop, utilizing the quadrature coupling envelopes of the signals from the sensors. The weighting functions for the feedback paths of this system are determined using the coupling function of the sensors:

$$W(\phi) = \frac{d}{d\phi} F(\phi) \cong -\sin(\phi)$$

The error in the observer is defined as $\tilde{\phi} = (\phi - \hat{\phi})$. The error dynamics of this system are governed by the nonlinear differential equation, which may be derived from the figure:

$$\frac{d^2 \tilde{\phi}}{dt^2} + c \frac{d\tilde{\phi}}{dt} \cos(\tilde{\phi}) + k\sin(\tilde{\phi}) = 0$$

For small errors, the dynamics are approximately linear, and are governed by:

$$\frac{d^2 \tilde{\phi}}{dt^2} + c \frac{d\tilde{\phi}}{dt} + k\tilde{\phi} = 0$$

Through proper choice of c and k, it is possible to achieve a tracking system with excellent properties. One choice for the poles of the linearized error dynamics are locations at 70 and 180 rad/s. This choice of pole locations leads to values of $k=3126$ rad/s$^2$ and $c=125.0$ rad/s. The poles should be chosen according to a balance between noise immunity and the effect of unmodeled system dynamics and locking speed.

This system has many benefits including a guarantee to acquire lock during normal operation and linear dynamics for small errors. In addition, in the two input system the sum of positions components ($\phi-\hat{\phi}$) cancel at the innovation to the phase-locked loop, negating the need to filter out such components as is necessary in single input phase-locked loops. A feature which is not possible with a single input PLL implementation is enabled through the use of a two input PLL. This feature also allows the observer to track an unchanging relative position. One of the best benefits of this non-linear observer is that its weighting function has been designed to minimize the effect from additive uncorrelated Gaussian noise.

One characteristic of the illustrated embodiment is that only the relative phase is known. More specifically, the number of periods between two vehicles is not determined directly at the output of the observer. When the vehicles are separated by some integer number of periods plus a fraction of a period, the observer outputs only the fraction of a period separation between the vehicles. However, the exact distance may be tracked uniquely by counting full periods as the relative distance changes.

Autonomous Position-Sensing

The algorithm developed in the previous section may be utilized for more tasks than just inter-vehicle position-sensing. The algorithms may also be utilized for autonomous position-sensing, where the vehicles are able to detect their own position relative to the guideway. This function is very much like that of an odometer, with some additional benefits. This approach does not suffer from accumulation errors, and is not dependent on wheel traction for its measurements.

Stationary Marker Signal

Figure 17:
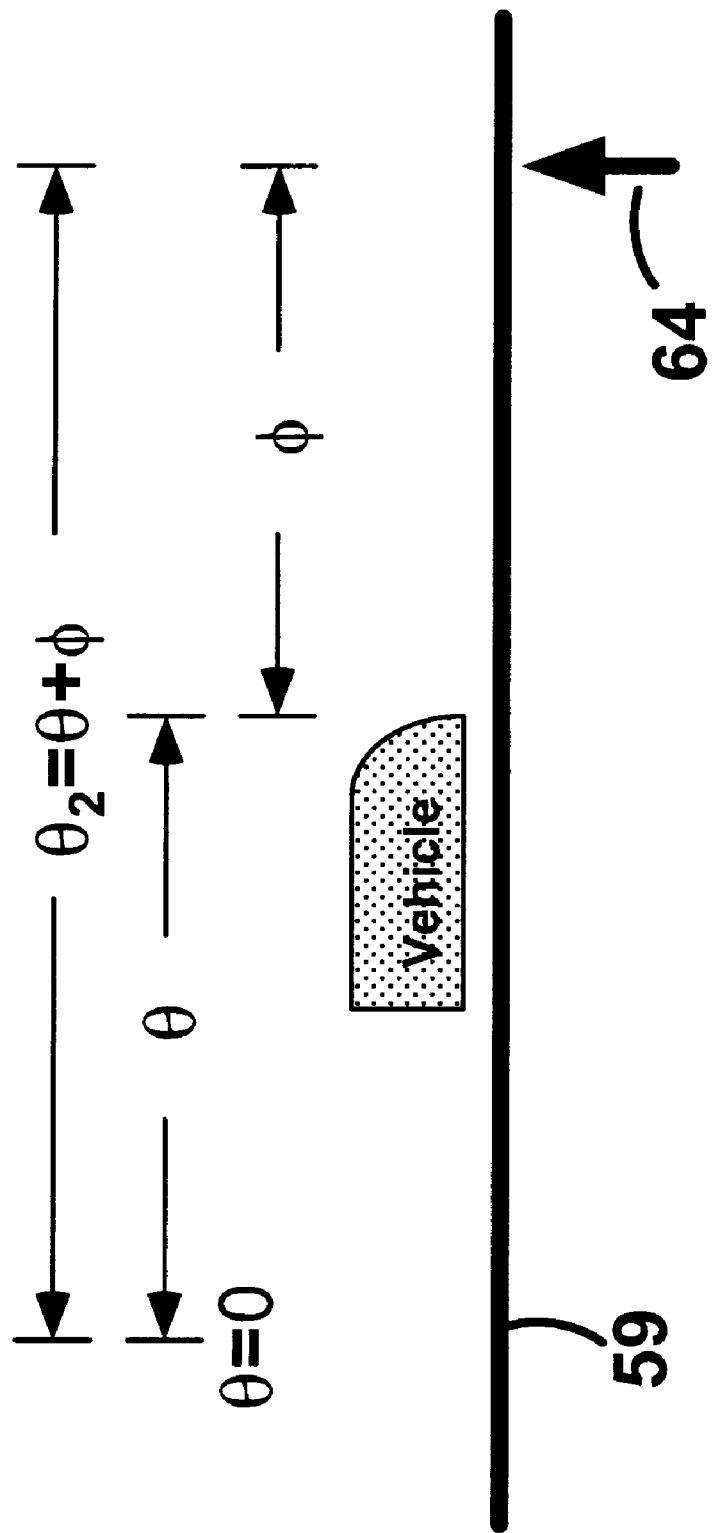
FIG. 17 illustrates the use of a stationary marker signal in a system according to the invention.

With access to all phases of the winding at the wayside, one may inject desired signals into each phase of the winding using a wayside transducer. It is then possible to inject "marker" signals (e.g., stationary marker signal 64) into the winding 59 identical to those produced by a stopped vehicle, as illustrated in FIG. 17. The system on board the vehicle does not distinguish between an actual stopped vehicle and the stationary marker signals, and is thus able to track its distance from the virtual marker. This technique may be applied to a winding with two or more phases. The signals, in the three-phase case, necessary to implement such a virtual marker are identical to those produced by a vehicle transmitter:

$V_{phaseA} = V_0 \cdot F(\theta_0) \cdot \cos(\omega_c t)$ $V_{phaseB} = V_0 \cdot F(\theta_0 - 2\pi/3) \cdot \cos(\omega_c t)$ $V_{phaseC} = V_0 \cdot F(\theta_0 + 2\pi/3) \cdot \cos(\omega_c t)$ A convenient choice of position would be $\theta=0$ resulting in the following signals:

$V_{phaseA} = 1 \cdot V_0 \cdot \cos(\omega_c t)$ $V_{phaseB} = -\frac{1}{2} \cdot V_0 \cdot \cos(\omega_c t)$ $V_{phaseC} = -\frac{1}{2} \cdot V_0 \cdot \cos(\omega_c t)$ The number of necessary wayside transmitters may be reduced by one by choosing an appropriate position for the marker. For instance, if $\theta_0=\pi/2$, the first of the three signals is zero. A further reduction in the number of necessary transmitters may be achieved by recognizing that common-mode signals on the three phases are rejected at the output of the vehicle sensor. This fact may be derived by examining the output of the vehicle sensor to a common-mode sinusoidal signal in all three phases and utilizing a trigonometric identity.

$$V_{sensor1} = V_2 \sin(\omega_c t + \beta)[\cos(\theta) + \cos(\theta - 2\pi/3) + \cos(\theta + 2\pi/3)]$$
$$= 0$$

Thus, a common-mode signal may be added to all three phases without any change in the signal detected at the sensor. One may thus choose to subtract the signal in Phase C of the case where $\theta=0$ from all three phases. Thus, the signals in the B and C phases are identically zero, and no transmitters are required to drive these phases. The signal in Phase A is now:

$$V_{phaseA} = \frac{3}{2} \cdot V_0 \cdot \cos(\omega_c t)$$

This result makes perfect sense from another point of view. Sensor 1 links the signal in Phase A with the cosine of position, and Sensor 2 links the signal in Phase A with the sine of position.

A real vehicle may detect its own position relative to this virtual marker vehicle, and thus position relative to a stationary point on the wayside. Again, only electrical position is measured with this technique, and additional information is necessary to track exact position. This objective may be accomplished though several methods, including use of magnetic or optical markers on the wayside which may be easily detected by the vehicle.

Virtual Marker Tracking

Figure 18:
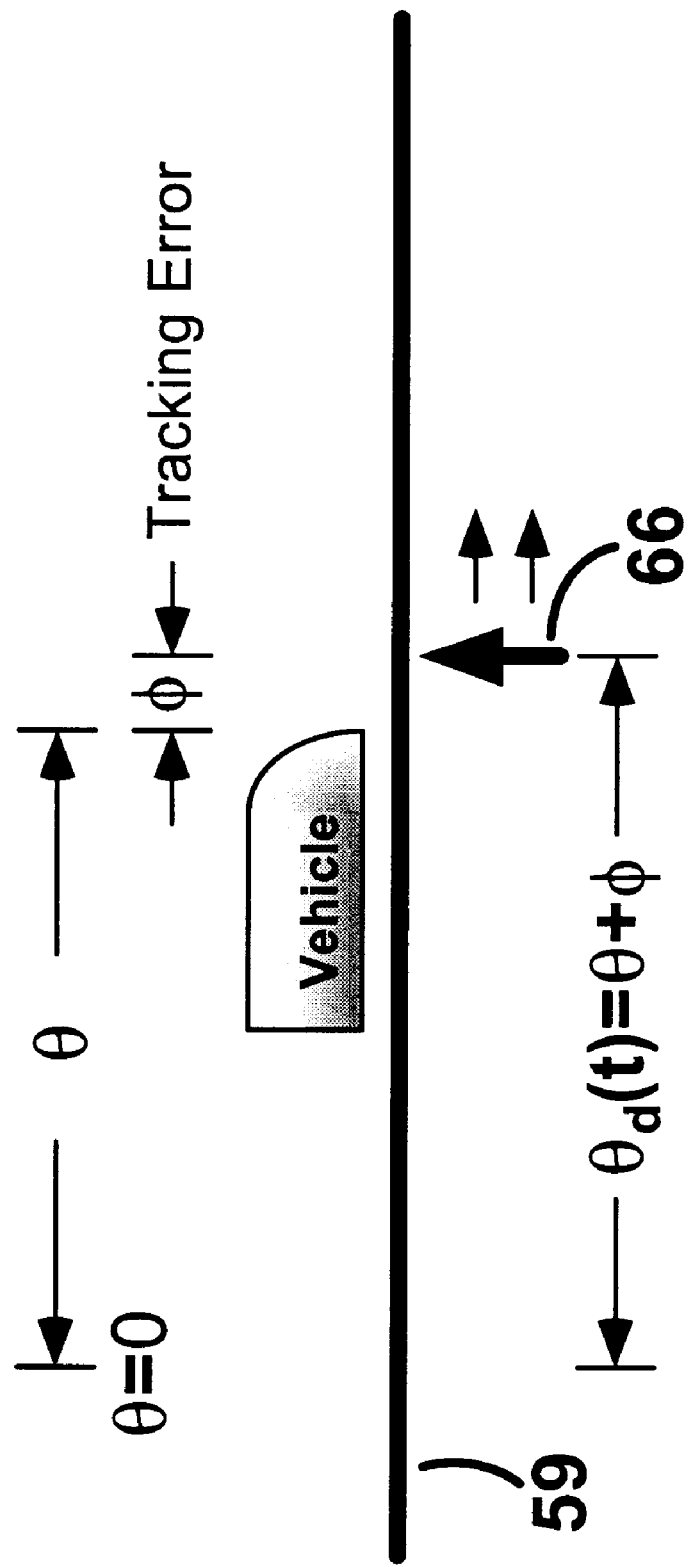
FIG. 18 illustrates the use of a moving marker signal in a system according to the invention.

Extending the previous concept one step further enables a point tracking feature. The wayside is not only capable of injecting a stationary marker signal 64 as in the previous section; it is also capable of injecting a moving marker signal 66 into the winding 59. The signals in this case are identical to the signals produced by a moving vehicle. If the vehicle controls its own propulsion, it may be directed to follow such a tracking signal, as illustrated in FIG. 18. It is thus possible to communicate to the actual vehicle exactly where it should be on the guideway at all times by instructing it to follow the marker. This concept is known as "point-following" in the transportation field and is the basis of several transportation control systems.

This feature also has another significant use if a Doubly Excited Linear Motor (DELM) is utilized for the propulsion of a transportation system. The DELM has been proposed for use in PRT systems. In this instance, several vehicles are propelled by the same stator winding. The stator produces a field moving at a constant velocity. The vehicles adjust their own field to lock into synchronism with the moving field while the vehicle advances or recesses relative to the moving field. In order to operate most efficiently, the vehicles need to know the relative phase of the field to their rotors. By placing moving virtual marker signals into the winding that move in synchronism with the stator field, the vehicles are able to track the relative position of the field.

The signals necessary to create a moving marker at desired position $\theta_d(t)$ for a vehicle to track are as follows:

$$V_{phaseA} = V_0 \cdot F(\theta_d(t)) \cdot \cos(\omega_c t)$$

$$V_{phaseB} = V_0 \cdot F(\theta_d(t) - 2\pi/3) \cdot \cos(\omega_c t)$$

$$V_{phaseC} = V_0 \cdot F(\theta_d(t) + 2\pi/3) \cdot \cos(\omega_c t)$$

Again, the number of wayside transmitters may be reduced by recognizing the common-mode rejection property of the sensors. In this case, signals in two phases are necessary to implement this feature with the following signals:

$$V_{phaseA} = V_0 \cdot [F(\theta_d(t)) - F(\theta_d(t) + 2\pi/3)] \cdot \cos(\omega_c t)$$

$$V_{phaseB} V_0 \cdot [F(\theta_d(t) - 2\pi/3) - F(\theta_d(t) + 2\pi/3)] \cdot \cos(\omega_c t)$$

Communications Structures, Circuitry and Methods

Communication between a vehicle and wayside station is a typical feature in a transportation control system, and is used to report vehicle status, destinations, speed, and other required information. The architecture utilized for the position-sensing functions requires no additional hardware for the addition of a communication link if the features are implemented digitally, such as with a digital signal-processor. Communication between vehicles or between wayside and vehicles is possible using the same signal path utilized for position-sensing signals.

Two communication methods are illustrated and discussed below for data transfer across the position-sensing winding. The first method utilizes a synchronous receiver approach. The term synchronous, in this instance, refers to synchronization of the receiver with vehicle position. This system may be utilized with a wide variety of modulation techniques able to transmit over a high-pass channel.

The second method utilizes an asynchronous receiver, which has the advantage that it is not dependent on knowledge of vehicle position for operation. This method will be described utilizing a form of frequency shift keying (FSK), but other modulation techniques may be utilized. In the FSK approach, separate frequencies are used to transmit each bit or symbol (if more than one bit per symbol). The techniques used to implement the asynchronous receiver are equally applicable to other forms of modulation such as quadrature amplitude modulation (QAM).

In the following sections, the transmission from wayside-to-vehicle will be addressed. The techniques used may be applied to vehicle-to-vehicle and vehicle-to-wayside communication without any modification. The techniques may be modified slightly for instances where more than two sensors are utilized in the receiver. These changes are very minor, and the basic techniques do not change.

It is necessary to understand the transmission of a communication signal between a wayside transmitter and vehicle sensors in order to implement a communication feature in this system. Suppose it is desired to transmit a modulated signal s(t) from the wayside to the receiver on the vehicle. A current signal proportional to s(t) is driven through the transmitter on one of the phases of the winding. The signals received in the sensors on board the vehicle are:

$$s_1(t) = \hat{s}(t)\cos(\theta)$$

$$s_2(t) = \hat{s}(t)\sin(\theta)$$

As with the position-sensing signals, the amplitude of signals coupled into the two sensors depends upon the position of the vehicle, θ. The original signal s(t) is filtered by the characteristics of the channel to form the component ŝ(t). The synchronous receiver attempts to correct for the dependency on position, and a channel equalizer may be utilized to compensate for the secondary filtering effect.

Synchronous Receiver

Figure 19:
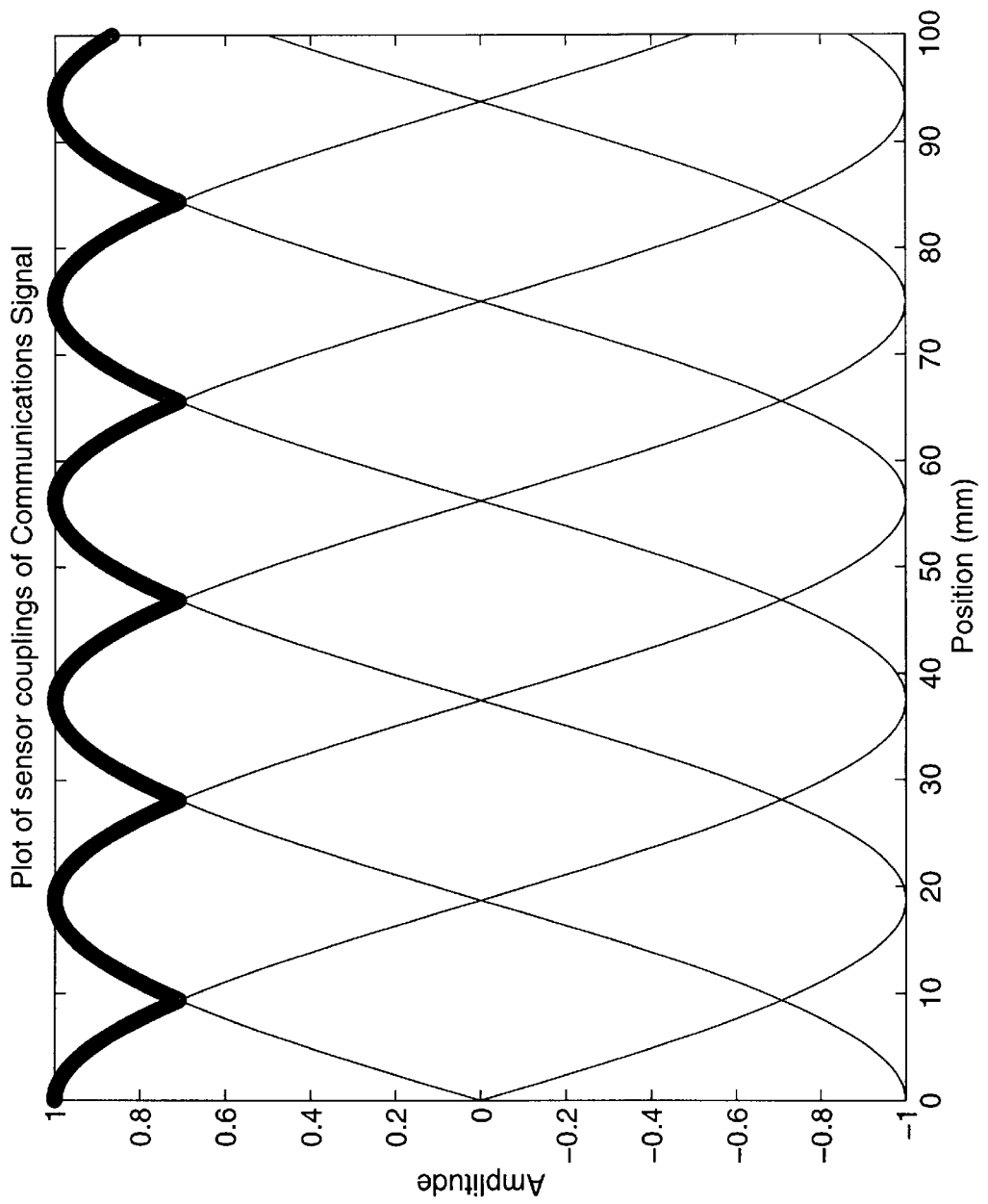
FIG. 19 illustrates the effect of rectifying sensor output envelopes, and their negatives, in a synchronous communications system according to the invention.

One possible compensation for position dependency would be to send to the receiver the largest amplitude signal from either sensor. Care must be taken not to change the sign of the signal, so one small adjustment must be made. Consider four signals—the two at the sensors and the negatives of these signals. It is possible to forward to the receiver the signal with the largest positive amplitude, and thus not inadvertently change the sign of the signal when a transition from one of the four signals to the next takes place. This technique is exactly the function of a synchronous rectifier, the behavior of which depends upon the coupling envelopes of the signals, and thus the position of the sensors. This rectifying effect is shown in FIG. 19, along with the coupling envelopes of the four signals. Note that the period in this figure is illustrated to be 75 millimeters.

Figure 20:
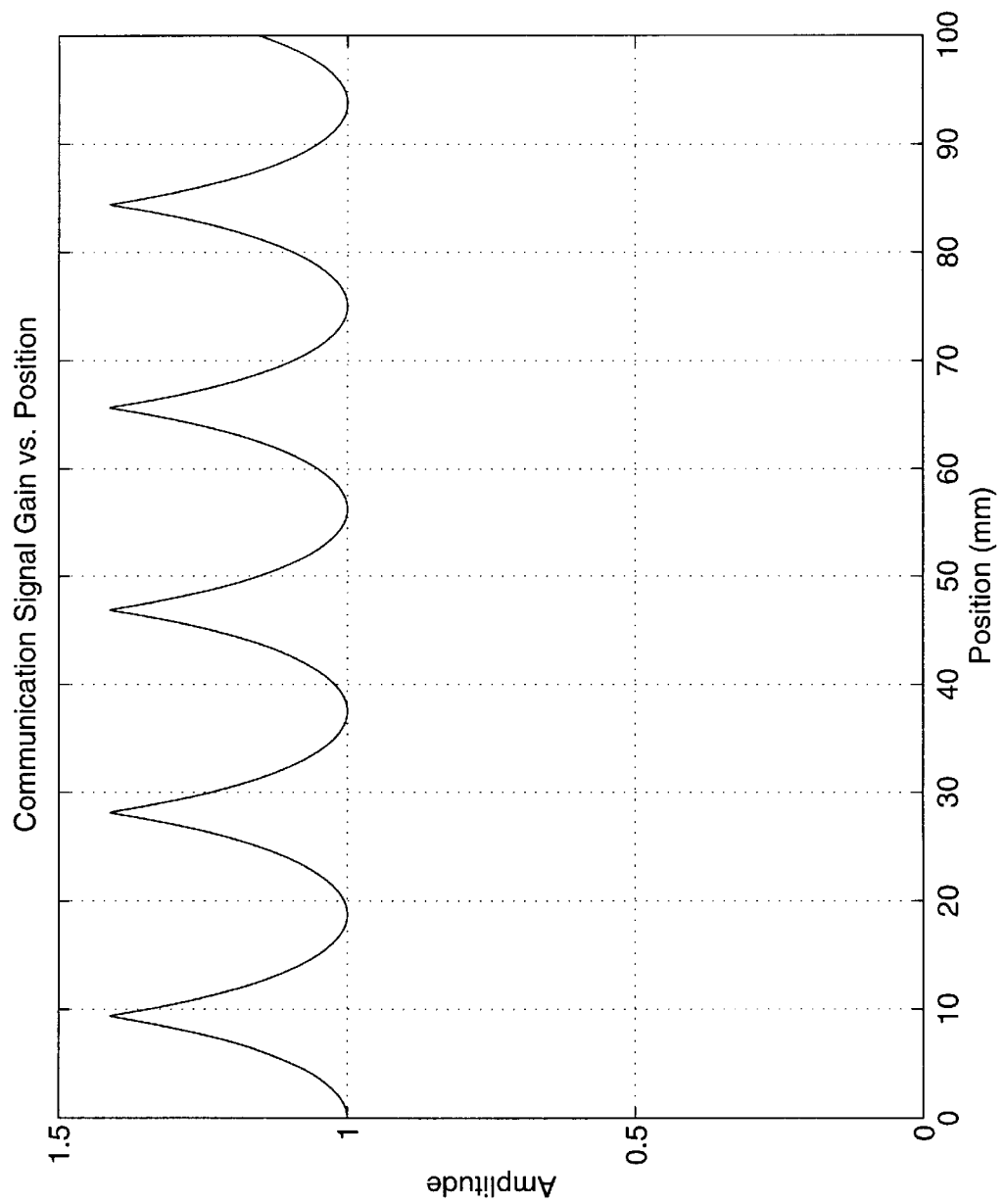
FIG. 20 illustrates a gain used to remove position-dependent ripple in a synchronous rectification communications system according to the invention.

Thus, as position changes, the choice of signal sent to the receiver would change every quarter cycle of the winding. In order to know which signal to forward to the receiver at any point in time, it is necessary to know the position of the vehicle. The autonomous position-sensing feature described previously could be used for exactly this purpose. For the communication between vehicles, the relative position-sensing feature would fulfill this requirement. This technique leaves a position-dependent ripple on the signal sent to the receiver, as seen in FIG. 19. While certain receivers may be able to compensate for this distortion, the ripple may be easily removed with a position-dependent gain which repeats every quarter cycle. The necessary position-dependent gain is illustrated in FIG. 20.

The synchronous receiver has effectively linearized the channel, removing any position dependence from the communication signal. The communication now has a linear, time-invariant channel over which to communicate, and any modulation and communication technique which can endure the characteristics of this channel (high-pass, etc.) may be utilized. The modifications to systems with three or more sensors is very straightforward. For instance, the only modification necessary to support three sensor communication in this system is the use of a six-pulse rectifier instead of a four-pulse rectifier, used in conjunction with the three-phase set of sensors.

Asynchronous Receiver

It is desirable, in many cases, to possess a communications system which is not dependent upon knowing the position of the vehicle. For instance, if the communication system is used to assign carrier frequencies for the position-sensing features, it is necessary that the communication system not be dependent of the position-sensing system. Also, in the case where a component has failed and the position-sensing feature is not in operation, there is significant merit in still possessing communication capability.

A second system was designed to operate while fulfilling this requirement and is appropriately called an asynchronous receiver, since it does not require any synchronization with the position of the vehicle. This system does, however, require some knowledge of the specific modulation techniques utilized. This method may be implemented using a frequency shift keying (FSK) approach, where a separate frequency is utilized to transmit each symbol. The pulse shapes in a FSK pulse are shown in the equation below:

$$p_i(t) = \begin{cases} A\sin(\omega_i t) & 0 \leq t < T \\ 0 & \text{otherwise} \end{cases}$$

The analog signal transmitted is thus $$s(t) = \sum_{m=-\infty}^{\infty} A p_{d[m]}(t - mT),$$

where d[m] is the digital signal to be transmitted.

Figure 21:
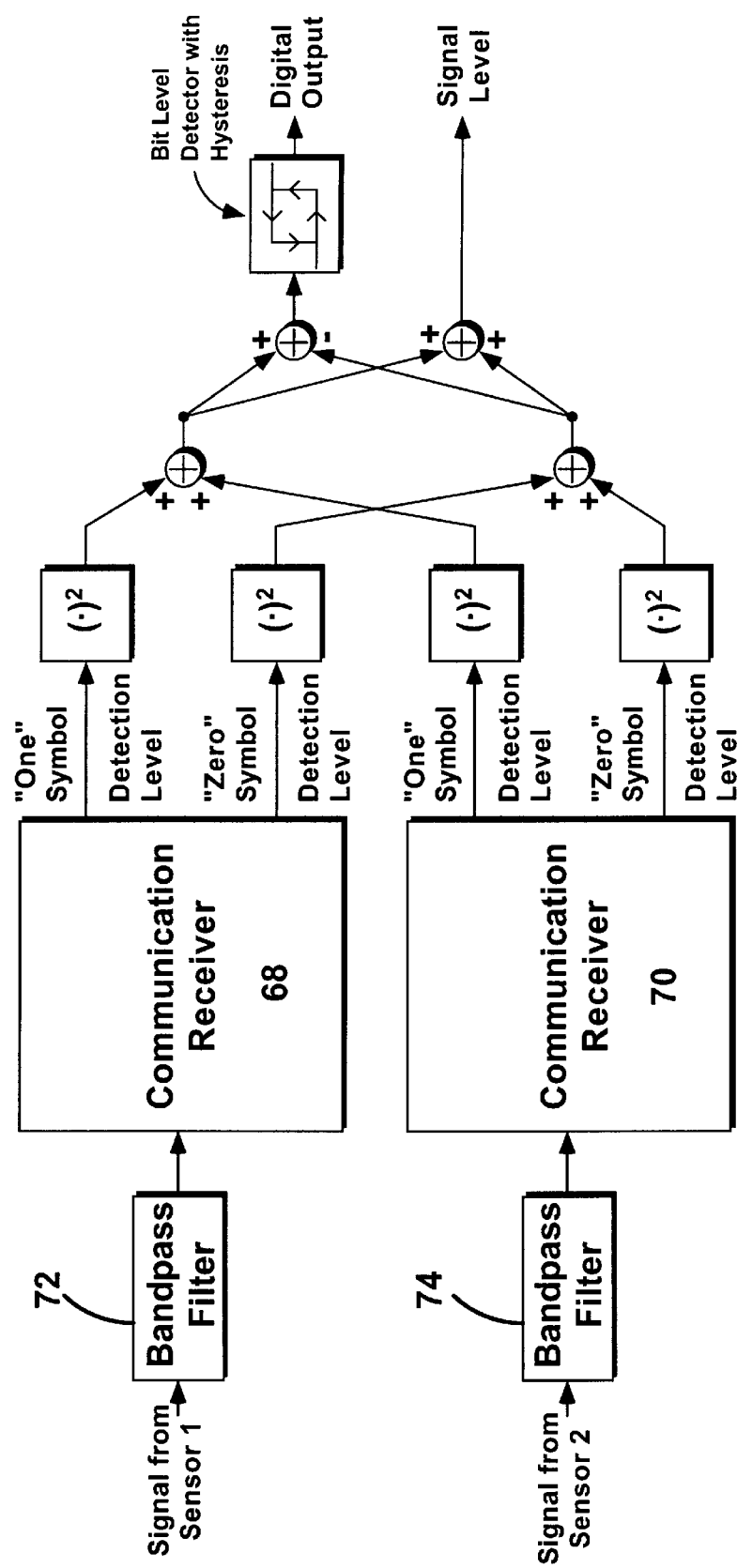
FIGS. 21 and 22 illustrate circuitry used to demodulate communications signals in an asynchronous communications system according to the invention.

In this technique, a separate receiver 68, 70 is used for each of the two channels, as shown in FIG. 21. Each receiver is designed to output a separate detection level for each possible symbol. In this demonstration technique, only two symbols are used to represent either a zero bit or a one bit. A bandpass filter 72, 74 is utilized in each receiver to isolate the communication signals from position-sensing signals and noise in the winding.

Figure 22:
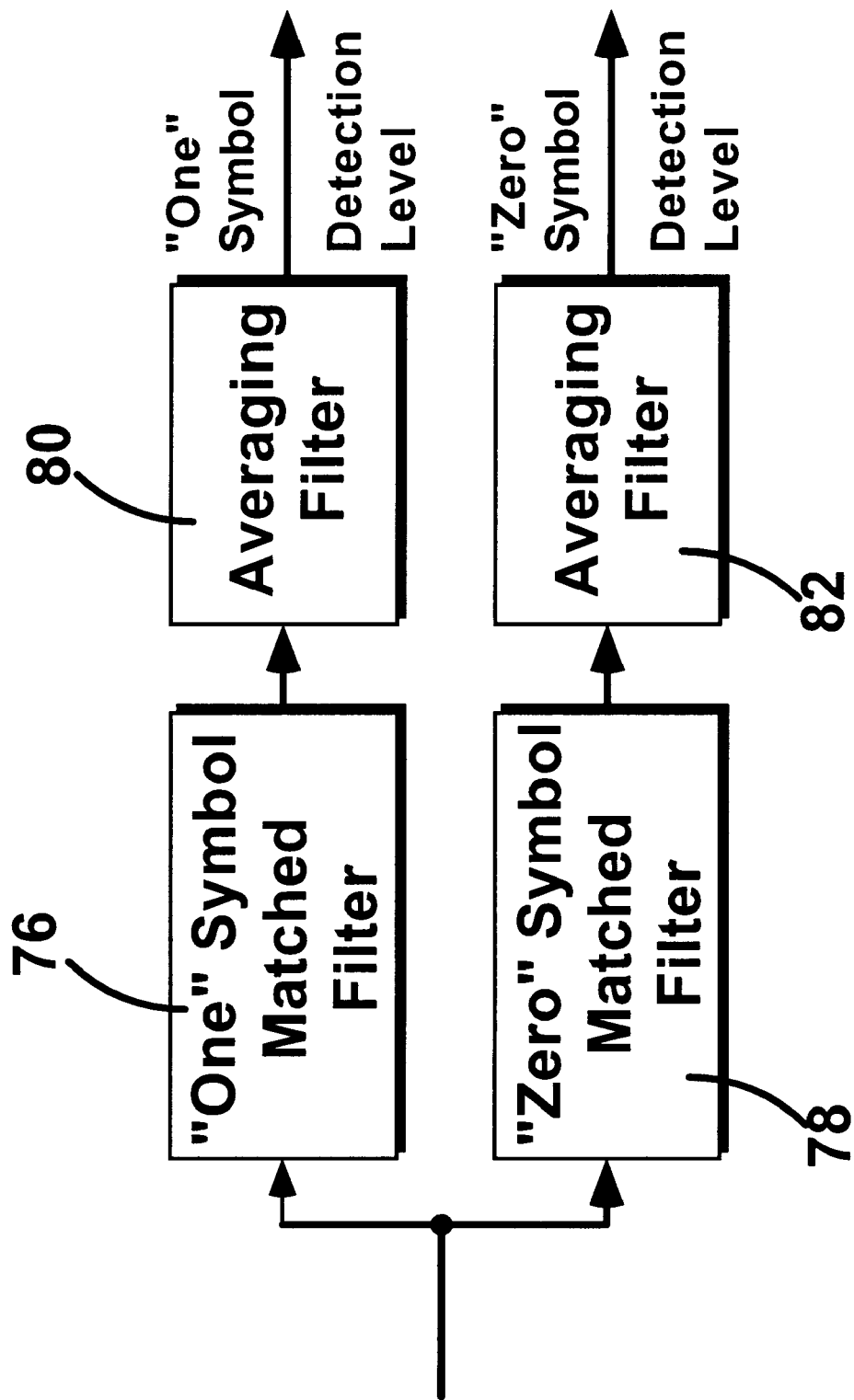

FIG. 22 shows one example of an FSK receiver in which, for each possible symbol, the input signal is passed through filter 76, 78 matched to the transmitted symbol followed by an averaging filter 80, 82, as shown. These filters are used to detect the level of each symbol in the communication signal for each sensor. Since the level of the signal from Sensor 1 is proportional to the cosine of position, the detected levels of the zero and one symbols at the output of the first receiver will also be proportional to $\cos(\theta)$. The level of the signal from Sensor 2 is proportional to the sine of position, so in a likewise manner the detected levels of the zero and one symbols at the output of the second receiver will both be proportional to $\sin(\theta)$.

In order to remove these dependencies on position, the detected zero symbol levels are squared and added and in a likewise manner the detected one symbol levels are squared and added. Due to the trigonometric identity $\sin^2(\theta)+\cos^2(\theta)=1$, these two signals are now proportional, respectively, to the square of the detected one symbol level and the square of the detected zero symbol level. While it is possible to take the square root of these new signals to compare and decode the transmission, it is computationally intensive and unnecessary in a practical implementation. By subtracting the squared zero symbol level from the squared one symbol level, a new signal is acquired which is negative when a zero is transmitted and positive when a one is transmitted. In order to add an extra level of noise immunity of the communication system, hysteresis may be added to the decision slicer (bit level detector). By adding the two signals, a separate signal level detector may be created. This implementation can produce a robust communication system over the winding, regardless of the movement of the vehicle.

Similar techniques may be utilized with other modulation methods to acquire higher bit rates. For instance, these techniques could be utilized with minimum shift keying (MSK) with no changes to double the bit rate. This approach may be used with almost any communication scheme which derives signal levels as outputs. For instance, these techniques can also be extended for use in a quadrature amplitude modulation (QAM) system. Since the output level is squared with this approach, only one quadrant of the QAM constellation would be usable since the sign of the output levels are lost. One further change necessary would be the use of a non-linear decision slicer, since the output signal levels are squared. Although the square root of the levels could be taken, the numerical routine would be computationally intensive. It is simpler to take the original slicer levels, and square them for use in a non-linear quantized slicer.

Further Embodiments

Another possible variation in the architecture is to change the configuration of sensors and transmitters. For instance, it is possible to expand the number of vehicle sensors, equally space them over a period, and achieve the same results with very minor changes to the algorithms. One particularly interesting case is the dual of the previous approach taken—to utilize two vehicle transmitters spaced a quarter cycle apart and only a single vehicle sensor.

This approach requires the use of two separate frequencies for the two transmitters. Otherwise, the signals generated in the winding are similar in form to the signals driven by a single transmitter. It is also necessary to use harmonically related frequencies for the two sensors. It is not possible to track the two carriers individually, as the signals received at the sensor will each go through zero crossings at regular vehicle spacings. One possible approach would be to use harmonically related carriers of the following form:

$$\cos(\omega_{c1}t) = \cos((N-1)\omega_c t)$$

$$\cos(\omega_{c2}t) = \cos(N\omega_c t)$$

A phase-locked loop (PLL) may be created to track the fundamental frequency $\omega_c$ from the two inputs. Each of the inputs may be squared, high pass filtered to remove the DC component, and fed into a separate phase detector. With the digital implementation of the phase-locked loop, it is possible for the PLL to output two frequencies. Each output frequency in this case would be double the carrier frequencies. These outputs would be fed back to the two phase detectors. The two phase detector outputs would be summed to feed the innovation to the PLL filter. Due to the signal couplings, one phase detector output signal would be proportional to the cosine of position squared and the other would be proportional to the sine of the position squared. Thus, there would be a constant input to the PLL to keep it locked. The PLL would also have dual demodulation outputs to demodulate the sensor signals.

Figure 23:
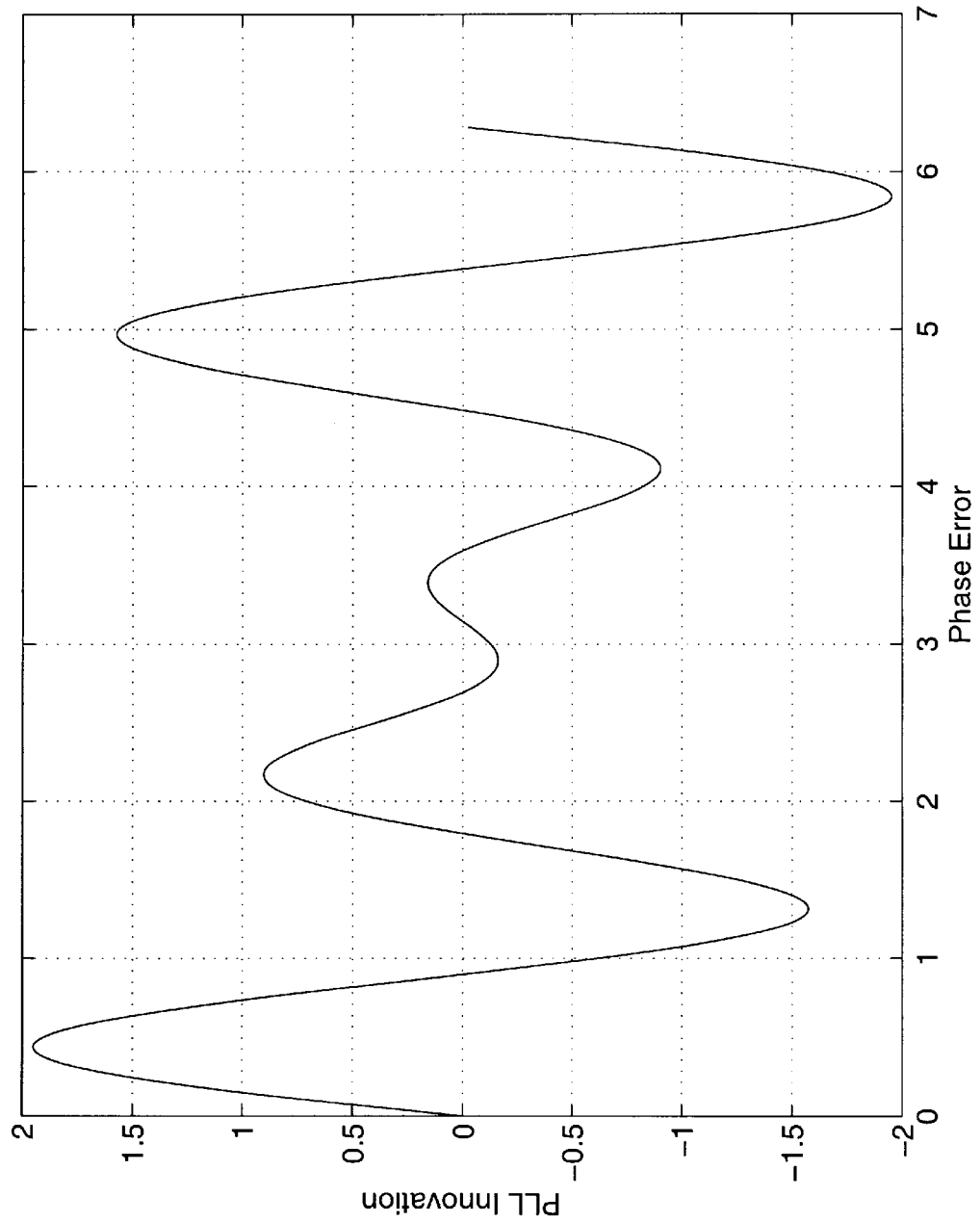
FIG. 23 illustrates the inputs of phase detectors in an alternate embodiment of the invention utilizing multiple transmitters and a single sensor.

There is a slight problem with this implementation which must be overcome. The PLL with the input from the two phase detectors has N stable equilibrium points, as shown in FIG. 23, with N=4. Thus, the system is not guaranteed to lock at the correct fundamental phase. One solution is to utilize a two step locking scheme. Initially, only one of the two phase detectors is utilized to lock the PLL onto the strongest of the two signals. The system is locked onto one of N possible, equally spaced choices for the fundamental phase.

When the other signal is strong enough to acquire an accurate reading, a choice among the N possible phases is made. In order to make the correct choice, the system utilizes one cycle of the signal not used for the initial lock. This signal is then correlated with the N possible outputs of the PLL. The correct choice will have the largest positive correlation, as the N correlations will have the amplitudes of N equally spaced points of one cycle of a cosine function. With the proper phase locked, both phase detectors are put into operation. This solution paves the way for the implementation of the techniques of this invention on a single phase winding implementation.

For long headway systems, where the vehicles are separated by long stretches of empty guideway, it may make sense to implement a system with a simpler, less expensive winding at the cost of implementing more complex algorithms on board each vehicle. While it is clear that a system with a single phase cannot be implemented with a single transmitter, a system with two vehicle sensors and two vehicle transmitters may be implemented successfully. Again, consider the case where two harmonically related carriers specified previously drive the two transmitters. Four signals are received at the sensors—two frequencies at each sensor. These four signals may be separated through filtering, and are of the form:

$$V_{t1s1} = V_4 \cos(\omega_{c1} t + \beta_1) \cdot \left[\frac{1}{2}\cos(\theta)\cos(\theta + \phi)\right]$$

$$V_{t1s2} = V_4 \cos(\omega_{c1} t + \beta_1) \cdot \left[\frac{1}{2}\cos(\theta)\sin(\theta + \phi)\right]$$

$$V_{t2s1} = V_4 \cos(\omega_{c2} t + \beta_2) \cdot \left[\frac{1}{2}\sin(\theta)\cos(\theta + \phi)\right]$$

$$V_{t2s2} = V_4 \cos(\omega_{c2} t + \beta_2) \cdot \left[\frac{1}{2}\sin(\theta)\sin(\theta + \phi)\right]$$

Squaring and adding the first two signals and squaring and adding the second two signals leads to the same form of inputs as is used in the dual phase detectors of the previous section. Thus, the demodulation scheme of the previous section may be used to recover the two carriers. These carriers may be used to demodulate the four coupling envelopes of the following. By linearly combining the first and fourth coupling envelopes, and combining the second and third coupling envelopes, signals of the same form used in the original non-linear observer may be created.

$C_{1+4} = \cos(\theta)\cos(\theta+\phi) + \sin(\theta)\sin(\theta+\phi) = \cos(\phi)$ $C_{2-3} = \cos(\theta)\sin(\theta+\phi) - \sin(\theta)\cos(\theta+\phi) = \sin(\phi)$ With the proper signal processing, the demodulator of the previous section, and the original non-linear observer, the relative position-sensing feature is enabled on a single-phase winding. A similar change to the virtual marker tracking may be made to enable operation over a single-phase winding. For this technique, the two frequencies are placed in the single phase with a wayside transmitter with magnitudes proportional to the coupling levels of a vehicle with two transmitters at the desired virtual marker position The autonomous position-sensing technique requires no changes to operate over a single-phase winding.

Communication may also be achieved over a single-phase winding by utilizing two separate transmitters in different frequency bands transmitting the same digital signal. The four received signal strengths may be combined to form an overall detection level for each symbol, and the signal may then be decoded.

Summary

Described herein are windings, transmitters, sensors and techniques for use thereof to permit the guideway-based sensing of, tracking of, and communication with objects, e.g., vehicles and waystations. It will be appreciated that these may be employed in a range of applications, including personal rapid transit (PRT), group rapid transit (GRT), baggage handling, freight handling, materials handling, highway and roadway guidance (e.g., for sensing, tracking and communication with cars and trucks).

It will also be appreciated that the illustrated embodiment is discussed herein by way of example and that other embodiments incorporating changes thereto fall within the scope of the invention. Thus, for example, windings, transmitters and sensors may be constructed from materials and in configurations other than those shown above. Moreover, those components may be used (and their signals interpreted) using logic and techniques other than the specific ones shown in the drawings and recited in the accompanying text. Further, whereas the position-sensing and communications signals are described above as periodic, those skilled in the art will appreciate that they may be quasi-periodic, as well.

In view thereof, what we claim is:

1. A guideway-based system for determining position, comprising
   a winding comprising two or more phased conductors, wherein each phased conductor comprises a conductive element configured in a periodically repeating pattern,
   a transmitter, disposed in electromagnetic coupling with the winding, for applying at least one position-sensing signal thereto, the position-sensing signal having an envelope that varies as a periodic function of a first position relative to the winding, and
   a sensor, disposed in electromagnetic coupling to the winding at a second position relative thereto, for generating a distance signal indicative of a distance between the first and second positions relative to the winding, the distance signal being generated as a function of a superposition of the position-sensing signals at the second position.

2. A system according to claim 1 for determining a position of a vehicle, wherein any of the transmitter and sensor are disposed on a vehicle that moves relative to the winding.

3. A system according to claim 2, wherein the transmitter is stationary with respect to the winding.

4. A system according to claim 1, wherein the two or more phased conductors form at least one closed current path.

5. A system according to claim 1, wherein the repeating pattern includes any of a saw tooth, a square wave, and sine wave.

6. A system according to claim 1, wherein the sensor is an inductive element disposed relative to the winding such that magnetic flux, resulting from the applied position-sensing signal and emanating from each phased conductors, induces any of a current and a voltage in the sensor dependent on a position of the sensor relative to the phased conductor.

7. A system according to claim 6, wherein the sensor generates a distance signal that has an envelope that varies as a periodic function of a distance between the first and second positions relative to the winding.

8. A system according to claim 7, wherein the sensor generates a distance signal with an envelope that varies substantially as a sinusoidal function of distance between the first and second positions relative to the winding.

9. A system according to claim 1, wherein transmitter generates magnetic flux and moves relative to the winding such that it induces in each phased conductor a position-sensing signal having an amplitude that depends upon the position of the transmitter relative to the phased conductor.

10. A system according to any of claims 6 and 9, wherein at least one of the transmitter and the sensor comprise a magnetically permeable core with winding therearound.

11. A system according to claim 10, wherein at least one of the transmitter and the sensor comprises a ferrite core having at least one pole disposed in facing relationship to the phased conductors of the winding and magnetic coupling therewith.

12. A system according to claim 1, wherein
the transmitter is stationary with respect to the winding,
the transmitter applies a position-sensing signal to at least one of the phased conductors, the position-sensing signal having an envelope that varies as a periodic function of a first position that is any of stationary and a moving position relative to the winding.

13. A guideway-based system for determining position, comprising
a winding comprising two or more phased conductors forming at least one closed current path, wherein each phased conductor comprises a conductive element configured in a periodically repeating pattern, and wherein the periodically repeating patterns of the phased conductors are offset with respect to one another,
a transmitter, disposed in electromagnetic coupling with the winding, for applying at least one position-sensing signal thereto, the position-sensing signal having an envelope that varies as a periodic function of a first position relative to the winding, and
a sensor, disposed in electromagnetic coupling to the winding at a second position relative thereto, for generating distance signal, indicative of a distance between the first and second positions relative to the winding, as a function of a superposition of the position-sensing signals at the second position.

14. A system according to claim 13, wherein the phased conductors of the winding are configured in substantially the same periodically repeating pattern.

15. A system according to claim 13, wherein
the repeating patterns of each of the phased conductors repeat over a period substantially equal to a first period,
phases of the repeating patterns of the phased conductors are substantially equally spaced over a period substantially equal to the first period.

16. A system according to claim 15, wherein each pair of phased conductors forms a closed current path.

17. A system according to claim 13, wherein the winding comprises three or more phased conductors that are electrically coupled to one another.

18. A system according to claim 17, wherein the three or more phased conductors are electrically coupled to one another at the ends.

19. A system according to claim 15, wherein the ends of the three or more phased conductors are electrically coupled to one another in a wye configuration.

20. A system according to any of claims 16 and 19, wherein the sensor is an inductive element disposed relative to the winding such that a combined magnetic flux emanating from the phased conductors induces in the sensor any of a current and a voltage that varies as a periodic function of a distance between the first and second positions relative to the winding.

21. A system according to claim 20, wherein the sensor generates a distance signal with an envelope that varies substantially as a sinusoidal function of a distance between the first and second positions relative to the winding.

22. A system according to claim 21 for determining a position of a vehicle, wherein any of the transmitter and sensor are disposed on a vehicle that moves relative to the winding.

23. A system according to claim 22, wherein the transmitter is stationary with respect to the winding.

24. A guideway-based system for determining position, comprising
a winding comprising two or more phased conductors forming at least one closed current path, wherein each phased conductor comprises a conductive element configured in a periodically repeating pattern, the repeating patterns of all of the phased conductors repeating over a period substantially equal to a first period, and phases of the periodically repeating patterns being offset with respect to one another,
a transmitter, disposed in electromagnetic coupling with the winding, for applying at least one position-sensing signal thereto, the position-sensing signal having an envelope that varies as a periodic function of a first position relative to the winding, and
a plurality of sensors disposed in electromagnetic coupling to the winding substantially at a second position relative thereto, each sensor generating a distance signal indicative of a distance between the first and second positions relative to the winding, the distance signal being generated as a function of a superposition of the position-sensing signals at the sensor,
the sensors being offset with respect to one another.

25. A system according to claim 24, wherein
the phased conductors are spatially offset from each other and substantially equally spaced over a period substantially equal to the first period, and
the plurality of sensors include first and second sensors that are offset a distance substantially equal to one-quarter of the first period.

26. A system according to claim 24, wherein
the phased conductors are spatially offset from each other and substantially equally spaced over a period substantially equal to the first period, and
the plurality of sensors include three or more sensors that are spaced over a period substantially equal to the first period.

27. A system according to any of claims 25 and 26, comprising circuitry for determining a distance between the first and second positions as a function of the distance signals generated by the first and second sensors.

28. A system for the transmission of information over a guideway, comprising
a winding comprising two or more phased conductors forming at least one closed current path,
a transmitter, disposed in electromagnetic coupling with the winding, for applying to the winding a transmitted information signal containing information being transmitted, the information signal coupled by the winding having an envelope that varies as a periodic function of a first position relative to the winding,
a sensor, coupled to the winding, for generating a received information signal containing the information being transmitted, the received information signal being generated as a function of a superposition of the transmitted information signals in the two or more phased conductors at a second position relative to the winding.

29. A system according to claim 28, wherein the sensor comprising an inductive element disposed relative to the winding such that magnetic flux, resulting from the transmitted information signal and emanating from the phased conductors at the second position, induces any of a current and a voltage dependent on a position of the sensor relative to the phased conductor.

30. A system according to claim 29, comprising a receiver, coupled to the sensor, for applying to the received information signal a gain that is a function of a position of the sensor relative to any of the transmitter and the phased conductor.

31. A system according to claim 28, comprising a plurality of sensors, each comprising an inductive element disposed relative to the winding such that magnetic flux, resulting from the transmitted information signal and emanating from the phased conductors at the second position, induces in each sensor any of a current and a voltage dependent on a position of that sensor relative to the phased conductor, and wherein at least two of the sensors are offset with respect to one another.

32. A system according to claim 31, comprising a receiver, coupled to the plural sensors, for generating a received information signal by rectifying outputs of the sensors and negatives thereof.

33. A system according to claim 32, wherein each phased conductor comprises a conductive element configured in a periodically repeating pattern, the repeating patterns of all of the phased conductors repeating over a period substantially equal to a first period, and phases of the periodically repeating patterns being offset with respect to one another over a period substantially equal to a first period.

34. A system according to claim 33, wherein there are two such sensors and wherein they are offset with respect to one another substantially by one-quarter of the first period, plus zero, one or more integral periods.

35. A system according to claim 33, wherein there are three or more such sensors and wherein they are substantially equally spaced over a period substantially equal to the first period, plus zero, one or more integral periods.

36. A system for the transmission of information over a guideway, comprising a winding comprising two or more phased conductors forming at least one closed current path, a transmitter, disposed in electromagnetic coupling with the winding, for applying to the winding (i) a transmitted information signal containing information being transmitted, the coupled information signal having an envelope that varies as a periodic function indicative of a first position relative to the winding, (ii) at least one position-sensing signal, the position-sensing signal having an envelope that varies as a periodic function indicative of a first position relative to the winding, and a receiver, coupled to the winding, for generating a received information signal containing the information being transmitted, the received information signal being generated as a function of a superposition of the transmitted information signals in the two or more phased conductors at a second position relative to the winding and as a function of a superposition of the position-sensing signals in the two or more phased conductors at the second position relative to the winding.

37. A system according to claim 36, wherein the receiver includes a sensor comprising an inductive element disposed relative to the winding such that magnetic flux resulting from (i) the position-sensing signal and
(ii) the transmitted information signal emanating from the phased conductors at the second position induces any of a current and a voltage that depends on a position of the sensor relative to the phased conductor.

38. A system according to claim 37, wherein the sensor generates a distance signal, indicative of a distance between the first and second positions relative to the winding, as a function of a superposition of the position-sensing signals at the second position, the receiver applies a gain to the received information signal as a function of the distance signal.

39. A system according to claim 36, wherein the receiver includes a plurality of sensors, each comprising an inductive element disposed relative to the winding such that magnetic flux, resulting from the transmitted information signal and emanating from the phased conductors at the second position, induces in each sensor any of a current and a voltage dependent on a position of that sensor relative to the phased conductor, at least two of the sensors are offset with respect to one another, the receiver includes a rectifier that generates the received information signal as a maximum positive amplitude output of the sensors and negatives thereof.

40. A system for the transmission of information over a guideway, comprising a winding comprising two or more phased conductors forming at least one closed current path, a transmitter, disposed in electromagnetic coupling with the winding, for applying thereto a transmitted information signal representing information being transmitted, a plurality of sensors, each comprising an inductive element disposed relative to the winding such that a magnetic flux resulting from the transmitted information signal induces in each sensor a channel signal having an envelope that varies as a periodic function of a position of that sensor relative the transmitter, wherein the sensors are offset with respect to one another, and a receiver, coupled to the plurality of sensors, for generating a received information signal as a function of the channel signals induced in the sensors, which function reduces a dependence of the information signal on the position of sensors relative to the transmitter, wherein the received information represents the information being transmitted.

41. A system according to claim 40, wherein the receiver generates a received information signal that is substantially independent of the position of the sensors relative to the transmitter.

42. A system according to claim 40, wherein the transmitted information signal comprises a plurality of symbols.

43. A system according to claim 42, wherein the receiver generates a detection level for each symbol contained in the channel signal of each sensor, and the receiver generates the received information to include, for each symbol, a sum of squares of detection levels for that symbol for all sensors.

44. A system according to claim 40, wherein the sensors are offset such that, at any instant, the magnetic flux resulting from the transmitted information signal induces any of a substantially non-zero current and a substantially non-zero voltage in at least one of the sensors.

45. A system according to claim 44, wherein the phased conductors are spatially offset from each other and substantially equally spaced over a period substantially equal to the first period, and the sensors are offset from one another by an amount substantially equal to integral multiple of one-quarter of the first period.

46. A system according to claim 45, wherein the receiver generates the received information signal as a function of a sum of squares of any of the currents and voltages induced in the sensors.

47. A system for position-sensing and communication over a guideway, comprising
- a winding comprising two or more phased conductors forming at least one closed current path,
- a transmitter, disposed in electromagnetic coupling with the winding, for applying to the winding
  - (i) a transmitted information signal containing information being transmitted, the coupled information signal having an envelope that varies as a periodic function of a first position relative to the winding,
  - (ii) at least one position-sensing signal, the coupled position-sensing signal having an envelope that varies as a periodic function of a first position relative to the winding, and
- a sensor, disposed in electromagnetic coupling to the winding at a second position relative thereto, for generating a distance signal indicative of a distance between the first and second positions relative to the winding, the distance signal being generated as a function of a superposition of the position-sensing signals at the second position;
- a receiver, coupled to the winding and to the sensor, for generating a received information signal containing the information being transmitted, the received information signal being generated as a function of a superposition of the transmitted information signals in the two or more phased conductors at a second position relative to the winding and as a function of the distance signal.

48. A system according to claim 47 for determining a position of a vehicle, wherein any of the transmitter and sensor are disposed on a vehicle that moves relative to the winding.

49. A system according to claim 48, wherein the transmitter is stationary with respect to the winding.

50. A system according to claim 48 comprising a plurality of sensors, each comprising an inductive element disposed relative to the winding such that magnetic flux, resulting from the transmitted information signal and the position-sensing signal and emanating from the phased conductors at the second position, induces in each sensor any of a current and a voltage dependent on a position of that sensor relative to the phased conductor.

51. A system according to any of claims 1, 13, 24, 28, 36, 40 and 48, wherein the winding conveys propulsion signals for driving a linear motor.

52. A system according to claim 51, wherein the winding comprises at least two sets of phased conductors, a first set for conveying the propulsion signals and a second set for conveying any of position-sensing signals and communication signals.

53. A system according to claim 52, wherein the one or more sensors are aligned transversely with respect to the winding.

54. A system according to claim 53, wherein transducers comprising a field array for the linear motor are substantially aligned with the winding.

55. A system according to claim 52, wherein the winding comprises Litz wire.

* * * * *